(12) United States Patent
Ellis et al.

(10) Patent No.: US 12,435,254 B2
(45) Date of Patent: Oct. 7, 2025

(54) TEXTILE TEMPERATURE REGULATING AGENTS

(71) Applicants: Devan Chemicals NV, Ronse (BE); Devan-Micropolis S.A., Moreira da Maia (PT)

(72) Inventors: John Ellis, Ambergate (GB); Roberto Fernando Almeida Teixeira, Moreira da Maia (PT); Ana de Sousa Carreira, Moreira da Maia (PT); Ivo Guiomar Pais, Moreira da Maia (PT)

(73) Assignees: Devan Chemicals NV, Ronse (BE); Devan-Micropolis S.A., Moreira da Maia (PT)

( * ) Notice: Subject to any disclaimer, the term of this patent is extended or adjusted under 35 U.S.C. 154(b) by 0 days.

(21) Appl. No.: 18/604,753

(22) Filed: Mar. 14, 2024

(65) Prior Publication Data
US 2024/0228853 A1    Jul. 11, 2024

Related U.S. Application Data

(62) Division of application No. 17/271,537, filed as application No. PCT/EP2019/073261 on Aug. 30, 2019.

(30) Foreign Application Priority Data

Aug. 31, 2018   (BE) .................................. 2018/5611
Aug. 31, 2018   (GB) .................................... 1814214

(51) Int. Cl.
| | | |
|---|---|---|
| C09K 5/06 | (2006.01) | |
| C08G 65/48 | (2006.01) | |
| C08L 71/02 | (2006.01) | |
| D06M 15/53 | (2006.01) | |

(52) U.S. Cl.
CPC .............. C09K 5/063 (2013.01); C08G 65/48 (2013.01); C08L 71/02 (2013.01); D06M 15/53 (2013.01); C08L 2205/02 (2013.01); D06M 2400/01 (2013.01)

(58) Field of Classification Search
CPC ......... C09K 5/063; C08G 65/48; C08L 71/02; C08L 2205/02; D06M 15/53; D06M 2400/01
See application file for complete search history.

(56) References Cited

U.S. PATENT DOCUMENTS

| | | | |
|---|---|---|---|
| 7,704,622 B1 * | 4/2010 | Meador | ............... H01M 8/1037 205/431 |
| 2002/0123560 A1 | 9/2002 | Audenaert et al. | |
| 2010/0015869 A1 | 1/2010 | Hartmann et al. | |
| 2010/0324205 A1 | 12/2010 | Maier et al. | |
| 2014/0183128 A1 | 7/2014 | Lee et al. | |

FOREIGN PATENT DOCUMENTS

| | | |
|---|---|---|
| CN | 106049029 A | 10/2016 |
| CN | 107541950 A | 1/2018 |
| WO | 2011023409 A1 | 3/2011 |
| WO | 2014005685 A1 | 1/2014 |
| WO | 2020043902 A1 | 3/2020 |

OTHER PUBLICATIONS

Shao, et al. In situ fabrication of cross-linked PEO/silica reverse-selective membranes for hydrogen purification. International Journal of Hydrogen Energy vol. 34, Issue 15, Aug. 2009, pp. 6492-6504.*
Wu et al. Synthesis, dynamic properties and electrochemical stability of organic-inorganic hybrid polymer electrolytes with double core branched structures based on polyether, cyanuric chloride and alkoxysilane. Electrochimica Acta, vol. 138, Aug. 20, 2014, pp. 30-40.*
Special Chem, Jeffamine M-2095—Amine, [online] available from: https://adhesives.specialchem.corn/product/p-huntsman jeffamine-m-2095-amine, accessed Aug. 6, 2019 (4 pages).
United Kingdom Patent Office Search Report for Application No. 1814214.1 dated Aug. 8, 2019 (4 pages).
Special Chem, Jeffamine M-3085—Amine, [online] available from: https://adhesives.specialchem.corn/product/p-huntsman jeffamine-m-3085-amine, publicly available as early as Nov. 30, 2021 (2 page).
International Search Report and Written Opinion for Application No. PCT/EP2019/073261 dated Oct. 7, 2019 (11 pages).
International Preliminary Report on Patentability for Application No. PCT/EP2019/073261 dated Mar. 2, 2021 (9 pages).
United Kingdom Intellectual Property Office Search Report for Application No. GB1814214.1 dated Mar. 8, 2019 (4 pages).
Belgian Search Report and Written Opinion for Application No. BE201805611 dated May 23, 2019 (11 pages including English translation of Opinion).
Portuguese Patent Office Action for Application No. 115760 dated May 17, 2021 (42 pages with English machine translation).

* cited by examiner

*Primary Examiner* — Amina S Khan
(74) *Attorney, Agent, or Firm* — Michael Best & Friedrich LLP

(57) ABSTRACT

The present invention relates to the use of compounds for imparting a temperature regulating effect to a textile and methods of manufacturing a temperature regulating textile. The present invention also relates to a method of manufacturing a temperature regulating textile, wherein the textile forms part of a non-apparel article. Compounds for imparting a temperature regulating effect on a textile are also described.

1 Claim, No Drawings

TEXTILE TEMPERATURE REGULATING AGENTS

RELATED APPLICATIONS

This application is a divisional of U.S. patent application Ser. No. 17/271,537, filed Feb. 25, 2021, which is the United States national stage entry under 35 U.S.C. § 371 of International Application Number PCT/EP2019/073261, filed Aug. 30, 2019, which claims priority to Great Britain Application Number 1814214.1, filed Aug. 31, 2018, and Belgium Application No. 2018/5611, filed Aug. 31, 2018, the entire contents of each of which are hereby incorporated by reference.

TECHNICAL FIELD

The present invention relates to the use of compounds for imparting a temperature regulating effect to a textile and methods of manufacturing a temperature regulating textile.

BACKGROUND ART

Phase change materials (PCMs) are widely used in a range of applications such as construction/building components, buffers in electronics and cold chain management systems. The ability of PCMs to absorb, store and release heat in response to a change in the temperature of their surrounding environment has also been exploited in the field of textiles. In particular, PCMs have been directly applied to textile surfaces to impart a temperature regulating effect onto a textile article.

The application of PCMs directly to the surface of a textile article can, however, have undesirable results. For example, when the surrounding environment is warm the PCM will adsorb heat and melt. As the PCMs melt they have a tendency to flow and migrate on the textile surface. Moreover, PCMs that have been directly applied to a textile surface have been discussed to be more prone to picking up dirt, to staining, to yellowing in sunlight, and demonstrating poor wash durability. They have also been associated with the production of unpleasant odours over time. Whilst the direct application of PCMs is relatively cheap and is easy to perform the durability and temperature regulating performance of the treated textile article is not ideal.

Recent attempts to overcome such problems include the encapsulation of PCMs within robust capsules. Once applied to a textile surface, the encapsulated PCMs are able to change phase without leaking onto the treated textile. The PCMs also benefit from the protection of the capsule shell from surrounding environmental factors. Microcapsules containing PCMs can be attached to the textile surface in a number of ways, such as using binders or by ionic interaction. However, whilst encapsulated PCMs solve some of the problems with the use of unmodified PCMs, they have drawbacks of their own. For example, encapsulated PCMs can provide poor moisture management properties (e.g. wicking characteristics and evaporation rates) to a treated textile surface which can lead to an undesirable final textile article.

The most common alternative to encapsulated PCMs are eutectic salt mixtures but these have been found to be less compatible with textile treatment applications.

It is an object of the present invention to obviate or mitigate one or more of the abovementioned disadvantages and/or to provide an improved temperature regulating agent for application to textile surfaces.

DISCLOSURE OF THE INVENTION

At its most general, the present invention proposes the use of certain modified PCMs which are able to react directly to bond to a textile surface (i.e. covalently). Modified polyetheramines are particularly envisaged.

The present inventors have surprisingly discovered that when modified PCMs react directly to the textile surface they can impart excellent temperature regulating properties to the textile. In fact, the modified PCMs of the present invention overcome many of the drawbacks associated with the traditional application of PCMs to textiles and the use of encapsulated PCMs. By directly bonding to the surface of the textile, the modified PCMs of the present invention avoid flow and migration on the textile surface and also have enhanced wash durability. Moreover, the modified PCMs of the present invention demonstrate superior moisture management properties as compared to the encapsulated PCMs.

SUMMARY OF INVENTION

The present invention proposes the use of polyetheramines having PCM properties to impart a temperature regulating effect to a textile. This is achieved in accordance with the present invention by covalently bonding the polyetheramine to a textile. This is in turn achieved by either providing a reactive (e.g. electrophilic) functional group on the textile which may react with nucleophilic groups on the polyetheramine (e.g. an amine group on the polyetheramine) or by way of providing a reactive functional group on the polyetheramine (e.g. an electrophilic group which may include a leaving group) which may react with nucleophilic groups on the textile.

Accordingly, in a first aspect, the invention provides the use of a compound according to formula (I) for imparting a temperature regulating effect to a textile:

wherein:
A is a polymer;
each B is independently selected from the group consisting of —NHR$_1$, —OH, —SH, —NR$_1$-L$_1$-X, —O-L$_1$-X and —S-L$_1$-X wherein:
R$_1$ is H or optionally substituted —C$_{1-6}$alkyl;
L$_1$ is a linker with a chain length having an integer from 1 to 10 atoms;
X is a group comprising an electrophilic moiety capable of accepting electrons from a nucleophile to form a covalent bond;
r is an integer from 1 to 3 and
wherein the melting point of the compound is from about 5° C. to about 55° C. and the use comprises forming a covalent bond between B and the textile.

In a second aspect, the invention provides a method of manufacturing a temperature regulating textile comprising:
applying a compound of formula (I) to a textile to form a covalent bond between the compound and the textile to provide the temperature regulating textile;

wherein:
  A is a polymer;
  B is selected from the group consisting of —NHR$_1$, —OH, —SH, —NR$_1$-L$_1$-X, —O-L$_1$-X and —S-L$_1$-X wherein:
    R$_1$ is H or optionally substituted —C$_{1-6}$alkyl;
    L$_1$ is a linker with a chain length having an integer from 1 to 10 atoms;
    X is a group comprising an electrophilic moiety capable of accepting electrons from a nucleophile to form a covalent bond;
    r is an integer from 1 to 3 and
  wherein the melting point of the compound is from about 5° C. to about 55° C.;
  wherein, when B is selected from the group consisting of —NR$_1$-L$_1$-X, —O-L$_1$-X and —S-L$_1$-X, the forming a covalent bond between the compound and the textile comprises forming a covalent bond between the electrophilic moiety capable of accepting electrons from a nucleophile and a nucleophilic group on the textile; and, when B is selected from the group consisting of —NHR$_1$, —OH and —SH, the forming a covalent bond between the compound and the textile comprises forming a covalent bond between B and an electrophilic moiety on the textile,
  provided that the compound of formula (I) is not a compound according to any of formulae (VI) to (IX) as follows:

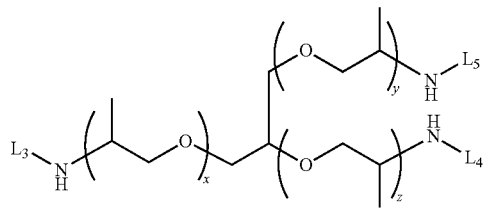

(VI)

wherein x, y and z are each a positive integer or zero and x+y+z is from about 35 to about 65, preferably from about 45 to about 55;

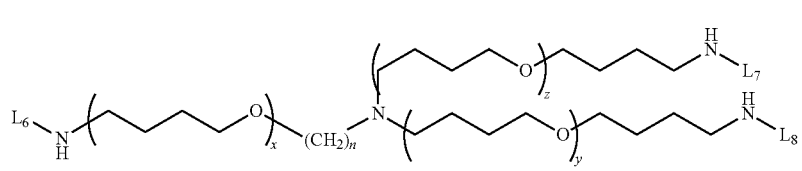

(VII)

wherein x, y, and z are positive integers and independently selected from about 5 to about 20;
n is 4; and

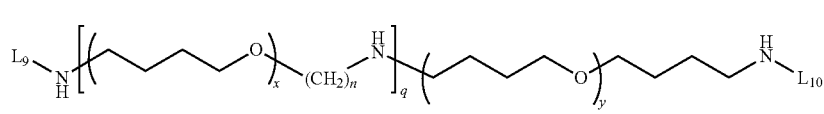

(VIII)

wherein x, y, and z are positive integers and independently selected from about 5 to about 20;
n is 4;
q is 0 to 2, optionally 1 to 2; and

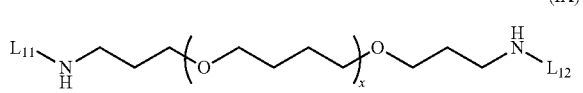

(IX)

wherein in the compound of the formula (IX), x is a positive integer from about 10 to about 50, preferably from about 25 to about 35 or even more preferably about 28; and
wherein L$_3$, L$_4$ L$_5$, L$_6$, L$_7$, L$_8$, L$_9$, L$_{10}$, L$_{11}$, and L$_{12}$ are each independently selected from H;

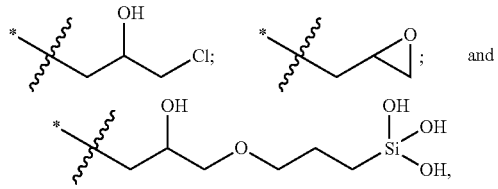

wherein (*) denotes the point of attachment to —NH as appropriate

In a third aspect, the invention provides a method of manufacturing a temperature regulating textile, wherein the textile forms part of a non-apparel article, the method comprising
  applying a compound of formula (I) to a textile to form a covalent bond between the compound and the textile to provide the temperature regulating textile;

$$A\text{---}(B)_r;\quad\quad (I)$$

wherein:
  A is a polymer;
  B is selected from the group consisting of —NHR$_1$, —OH, —SH, —NR$_1$-L$_1$-X, —O-L$_1$-X and —S-L$_1$-X wherein:
    R$_1$ is H or optionally substituted —C$_{1-6}$alkyl;
    L$_1$ is a linker with a chain length having an integer from 1 to 10 atoms;

X is a group comprising an electrophilic moiety capable of accepting electrons from a nucleophile to form a covalent bond;

r is an integer from 1 to 3; and wherein the melting point of the compound is from about 5° C. to about 55° C.; and when B is selected from the group consisting of —$NR_1$-$L_1$-X, —O-$L_1$-X and —S-$L_1$-X, the forming a covalent bond between the compound and the textile comprises forming a covalent bond between the electrophilic moiety capable of accepting electrons from a nucleophile and a nucleophilic group on the textile; and when B is selected from the group consisting of —$NHR_1$, —OH and —SH, the forming a covalent bond between the compound and the textile comprises forming a covalent bond between B and an electrophilic moiety on the textile.

In a fourth aspect, the invention provides a compound as defined herein for imparting a temperature regulating effect on a textile. Such compounds include compounds of the formula (I) as defined herein.

Textiles (i.e. functionalised textiles) prepared according to the methods described in the second and third aspects and any embodiments thereof described herein are also provided.

DETAILED DESCRIPTION

As described herein, the first aspect of the invention described herein provides the use of the compound according to formula (I) for imparting a temperature regulating effect to a textile. The second and third aspects of the invention described herein provide a method of manufacturing a temperature regulating textile. The fourth aspect of the invention described herein provides a compound according to formula (I) for imparting a temperature regulating effect to a textile.

It will be appreciated that the temperature regulating effect referred to herein relates to ability of a textile or textile article as described herein to absorb or release heat to regulate the temperature of the surrounding environment (e.g. the skin temperature of a user coming into contact with the textile or article during use). The textile or textile articles of the present invention may possess cooling and/or warming properties.

In desirable embodiments, the temperature regulating article or textile of the invention has the effect that when a user contacts the surface of the article or textile a cooling sensation is experienced by the user. This is experienced because, when the user touches the treated surface of the temperature regulating textiles or articles described herein, heat flows from the skin of the user onto the treated surface. This causes the compounds of the formula (I), which are covalently bonded to the surface of the temperature regulating textiles or articles, to change phase. As this phase change requires energy to occur, thermal energy (heat) is drawn from the skin of the user thus causing a cooling sensation as the user touches the treated surface of the temperature regulating textiles or articles. It will be appreciated that in any aspect or embodiment as described herein a combination of compounds of formula (I) (preferably two or more) may be used in combination to impart a temperature regulating effect.

The temperature regulating articles or textiles of the present invention have measurable enthalpy of fusion values which can be used to measure their temperature regulating performance. The skilled person will appreciate that this can be performed using differential scanning calorimetry known in the art.

The uses and methods of the invention described above require that a covalent bond be formed between B and the textile. When B is selected from the group consisting of —$NR_1$—$L_1$-X, —O-$L_1$-X and —S-$L_1$-X as described herein (wherein X comprises an electrophilic group), it will be appreciated that the covalent bond may be formed between the B group and a nucleophilic group on the textile wherein a covalent bond is formed by virtue of the electrophilic moiety accepting electrons from the nucleophile to form a covalent bond with the textile. The covalent bond may be formed by nucleophilic substitution or addition. For example, if the electrophilic moiety X either is, or includes, a leaving group (e.g. a halide or sulfonate) as described herein, the displacement of the leaving group with the nucleophile via a nucleophilic substitution reaction may occur to form the covalent bond. Alternatively, if the electrophilic moiety of X includes an epoxide, the addition of the nucleophile to the electrophilic moiety can lead to the opening of the epoxide via a nucleophilic addition reaction to form the covalent bond. Other bond forming reactions between nucleophiles and electrophilic moieties will be readily apparent to the skilled person and are envisaged within the scope of the present invention, e.g. reactions between nucleophiles and Michael acceptors. When B is selected from the group consisting of —$NHR_1$, —OH or —SH, it will be appreciated that the covalent bond may be formed between the B group and an electrophilic group on the textile wherein a covalent bond is formed by virtue of the electrophilic moiety accepting electrons from the nucleophilic B group to form a covalent bond with the textile. It will be appreciated that the covalent bond may be formed by nucleophilic substitution or addition. In such embodiments, the textile may thus include any electrophilic moiety capable of forming a covalent bond with the —$NHR_1$, —OH or —SH groups of the compound according to formula (I). For instance, the textile may be endowed with a suitable leaving group or Michael acceptor or the like. The electrophilic moiety may be provided on the textile by first treating the textile to append a reactive group to the textile surface. For instance this may be a reactive linking group or a reactive bridging group (e.g. epichlorohydrin or 3-glycidyloxypropyltrimethoxysilane) which is applied to the textile prior to formation of the covalent bond between B and the textile. Such groups are typically bifunctional in that they will exhibit a reactive moiety capable for forming a bond with the textile and a remaining pendant moiety for reacting with the B group of the compound of formula (I). As mentioned above, epichlorohydrin and 3-glycidyloxypropyltrimethoxysilane are suitable examples of reagents that can be used to functionalise the textile for ready acceptance of a nucleophile, but others will be readily apparent to the skilled person and are contemplated within the scope of the invention. Once the textile is treated with a reactive group such that the textile includes a reactive moiety suitable for forming a covalent bond with the —$NHR_1$, —OH or —SH groups of the compound according to formula (I), formation of the covalent bond between B and the textile can then be conducted.

The skilled person will be readily able to determine suitable reaction conditions for creating the covalent bond depending on the nature of the given electrophile/nucleophile pairing involved in the reaction.

Compounds of the Present Invention

Various embodiments of the compounds of the formulae (I)-(IX) are described in this application. It should also be understood below that embodiments of a compound of any of these formulae are defined by reference to the respective substituent groups. It is intended that features specified in each of these embodiments may be combined with other features specified in other embodiments to provide further embodiments of the invention. The skilled person will also appreciate that any chemically impossible compounds that would result from combining one of more of the embodiments described herein are not intended to be encompassed within the context of this invention. Moreover, it will also be understood that in accordance with the definitions of formulae (I)-(IX) provided herein, certain combinations may present chemical compounds containing heteroatom to heteroatom bonds. Such compounds are claimed only in so far as they can be utilised for and tolerated in the use or methods as described herein.

Compounds in accordance with the first, third and fourth aspects of the invention are of the formula (I) $(A-(B)_r)$ as described with reference to the definitions provided below.

Compounds in accordance with embodiments of the second aspect of the invention are of the formula (I) $(A-(B)_r)$ as described with reference to the definitions provided below and provided that the compound of the formula (I) is not selected from any of formulae (VI) to (IX) described below and further herein:

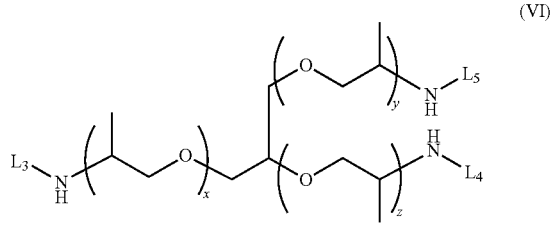

(VI)

wherein x, y and z are each a positive integer or zero and x+y+z is from about 35 to about 65. Typically x+y+z is from about 45 to about 55. $L_3$-$L_5$ are as defined herein;

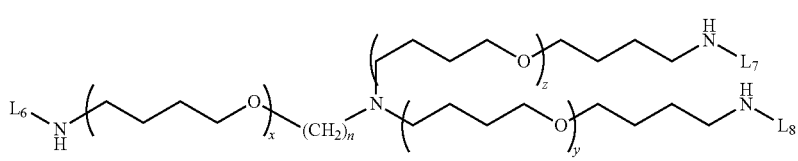

(VII)

wherein x, y, and z are positive integers and independently selected from about 5 to about 20, and n is 4. $L_6$-$L_{10}$ are as defined herein;

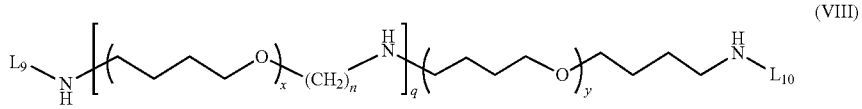

(VIII)

wherein x, y, and z are positive integers and independently selected from about 5 to about 20, n is 4, q is 0 to 2. Typically q is optionally 1 to 2. $L_6$-$L_{10}$ are as defined herein;

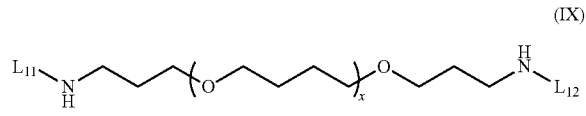

(IX)

wherein x is a positive integer from about 10 to about 50, Typically, x is a positive integer from about 25 to about 35. $L_{11}$-$L_{12}$ are as defined herein.

A Groups

In accordance with any of the aspects or embodiments described herein, A is a polymer. In typical embodiments, A is a polyether. For the avoidance of doubt, a polyether as referred to herein includes polymers having a repeating unit containing a carbon-oxygen-carbon motif.

In accordance with any of the aspects or embodiments described herein, the polyether may be of the formula (II)

(II)

wherein (***) denotes the point of attachment to B and $R_4$, E, F, G, D and B are as defined according to any embodiments herein.

In accordance with any of the aspects or embodiments described herein, when $R_4$, E, F, G and D are taken together the polyether may be of the formula (III):

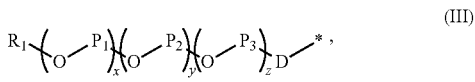

(III)

wherein (*) denotes the point of attachment to B and $R_4$, $P_1$, $P_2$, $P_3$, D, B, x, y, and z are as defined herein.

In accordance with any of the aspects or embodiments described herein the polyether of formula (III) may be

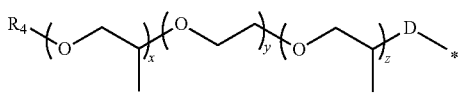

wherein (*) denotes the point of attachment to B; and $R_4$, D, x, y and z are as defined herein.

In accordance with any of the aspects or embodiments described herein the compound according to formula (I) when $R_4$, E, F, G and D are taken together the polyether may be of the formula (IVa) or (IVb):

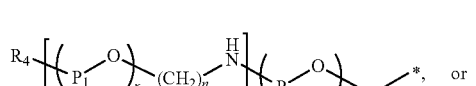

(IVa)

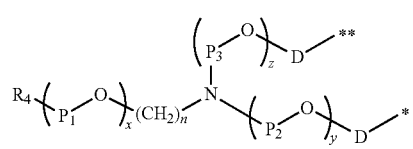

(IVb)

wherein:
x, y, and z are each independently selected from an integer of from 5 to 20;
n is 4;
q is 0 to 2, optionally 1 to 2; and
D is an optionally substituted —$C_{1-6}$alkylene; and
wherein (*) denotes the point of attachment to B and (**) denotes the point of attachment to another separately independent B; and
wherein $P_1$, $P_2$, $P_3$ are as defined according to any embodiment herein.

In accordance with any of the aspects or embodiments described herein, when $R_4$, E, F, G and D are taken together, the polyether may be of the formula (V)

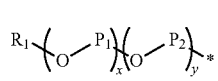

(V)

wherein (*) denotes the point of attachment to B and $R_4$, $P_1$, $P_2$, B, x and y are as defined herein.

m, n and r Groups

In accordance with any of the aspects or embodiments described herein, m, n and r may each be independently positive integers from 1 to 5. In embodiments, m may be 1, 2 or 3. Preferably, m may be 1. In embodiments, n may be 1 to 4, more preferably, n may be 4. r may in embodiments be 1, 2 or 3.

x, y and z Groups

In accordance with any of the aspects or embodiments described herein, x, y and z may be independently selected as integers from 0 to 100. In the context of groups x, y and z discussed herein, the values depicted are intended to be integer values. By way of example, referring to embodiments wherein x is from 2 to 100 refers to wherein is selected from any of the integer values between 2 and 100 inclusive of 2 and 100. In embodiments, x, y and z may each independently be a positive integer or 0 and the sum of x+y+z is from about 2 to about 100. In yet further embodiments x+y may be from 2 to 20 and y may be from 30 to 50. In other embodiments, x+z may be from 5 to 15 and y may be from 35 to 45. In embodiments, x+z may be from 5 to 10 and y may be from 35 to 45, preferably wherein x+z is 6 and y is 39. In yet further embodiments x and y may be from 5 to 20.

In accordance with any of the aspects or embodiments described herein, the ratio of x to y may from about 1:20 to about 20:1, preferably the ratio of x to y may be from 1:15 to about 15:1, from 1:10 to about 10:1 or from 1:5 to about 5:1. More preferably, the ratio of x to y may be 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19 or 1:20. Even more preferably, the ratio of x to y may be 11:1.

In accordance with any of the aspects or embodiments described herein, when $R_4$, E, F, G and D are taken together the polyether may be of the formula (III):

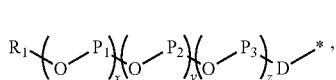

(III)

wherein (*) denotes the point of attachment to B; $R_4$, $P_1$, $P_2$, $P_3$, D and B are as defined herein; and x, y and z are each a positive integer or zero and the of sum of x+y+z is from about 2 to about 100.

In accordance with any of the aspects or embodiments described herein the polyether of formula (III) may be

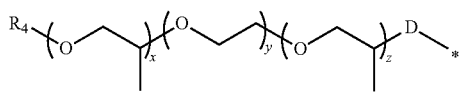

wherein (*) denotes the point of attachment to B and $R_4$, D and B are as defined herein, wherein the sum of x+z is from 2 to 20 and y is from 30 to 50. Typically, wherein x+z is from 5 to 15 and y is from 35 to 45.

In accordance with any of the aspects or embodiments described herein when $R_4$, E, F, G and D are taken together the polyether may be of the formula (V)

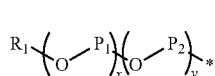

(V)

wherein (*) denotes the point of attachment to B and $R_4$, $P_1$, $P_2$ and B are as defined herein and the ratio of x to y is from about 1:20 to about 20:1. Typically, the ratio of x to y is about 11:1. In some embodiments, the average molecular weight may be about 2000.

q Groups

In accordance with any of the aspects or embodiments described herein, q may be a positive integer from 0 to 5. In embodiments, q may be a positive integer from 0 to 2, optionally 1 to 2. In further embodiments, q may be 1, 2, 3, 4 or 5. Preferably, q may be 1 or 2.

E Groups

In accordance with embodiments of the first, third and fourth aspects of the invention described herein, E may be selected from

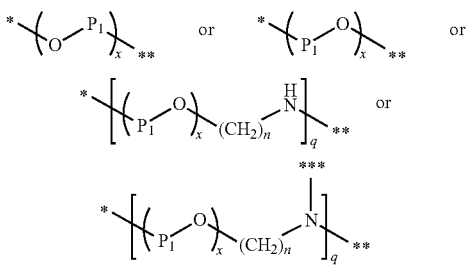

or E is absent, wherein (*) denotes the point of attachment to $R_4$, () denotes the point of attachment to F, G, D or B as appropriate and (*) denote the point of attachment to another separately independent F, G, D or B as appropriate. In such embodiments, $P_1$, x, q and n are as defined herein.

In accordance with embodiments of the second aspect of the invention described herein, E may be selected from

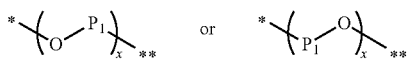

or E is absent, wherein (*) denotes the point of attachment to $R_4$, (**) denotes the point of attachment to F, G, D or B as appropriate. In such embodiments, $P_1$ and x are as defined herein.

In accordance with any of the aspects or embodiments described herein, E may be

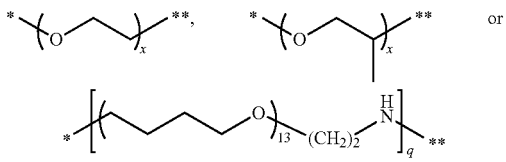

wherein (*) denotes the point of attachment to $R_4$; and (**) denotes the point of attachment to F, G, D or B as appropriate; and x and q are as defined according to any embodiment herein.

F Groups

In accordance with the first, third and fourth aspects of the present invention described herein, F may be selected from

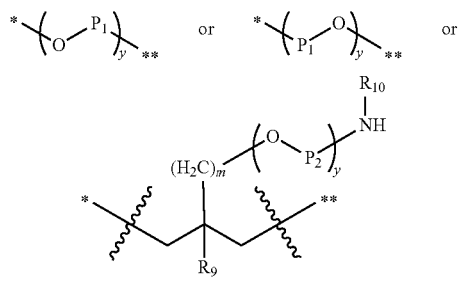

or F is absent, wherein (*) denotes the point of attachment to E or $R_4$ as appropriate and (**) denotes the point of attachment to G, D or B as appropriate. In such embodiments, $P_2$, $R_9$, $R_{10}$, y and m are as defined herein.

In accordance with the second aspect of the present invention described herein, F may be selected from

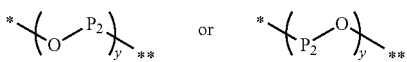

or F may be absent, wherein (*) denotes the point of attachment to E or $R_4$ as appropriate and (**) denotes the point of attachment to G, D or B as appropriate. In such embodiments, $P_2$, $R_9$, $R_{10}$, y and m are as defined herein.

In accordance with any of the aspects or embodiments described herein, F may be selected from

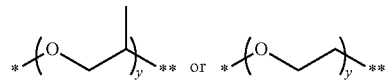

wherein (*) denotes the point of attachment to E or $R_4$ as appropriate and (**) denotes the point of attachment to G, D or B as appropriate. In such aspect and embodiments y is as defined herein.

G Groups

In accordance with any of the aspects or embodiments described herein, G may be selected from

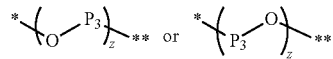

or G is absent, wherein (*) denotes the point of attachment to E, F or $R_4$ as appropriate and (**) denotes the point of attachment to D or B as appropriate. In such aspect and embodiments, $P_3$ and z are as defined according to any embodiment herein.

In accordance with any of the aspects or embodiments described herein, G may be

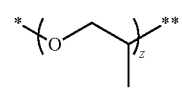

wherein (*) denotes the point of attachment to E, F or $R_4$ as appropriate; (**) denotes the point of attachment to D or B as appropriate; and z is as defined herein.

$P_1$, $P_2$ and $P_3$ Groups

In accordance with any of the aspects or embodiments described herein, $P_1$, $P_2$ and $P_3$ may be each independently selected from optionally substituted —$C_{1-6}$alkylene, optionally substituted —$C_{2-6}$heteroalkylene, optionally substituted —$C_{3-6}$cycloalkylene, optionally substituted —$C_{3-6}$heterocycloalkylene, optionally substituted —$C_{2-6}$alkenylene, optionally substituted —$C_{2-6}$heteroalkenylene, optionally substituted —$C_{3-6}$cycloalkenylene, optionally substituted —$C_{3-6}$heterocycloalkenylene, optionally substituted —$C_{2-6}$alkynylene, optionally substituted —$C_{2-6}$heteroalkynylene, optionally substituted —$C_{6-14}$arylene or optionally substituted —$C_{5-14}$heteroarylene, optionally substituted —C(=O)$C_{1-20}$alkylene, optionally substituted —$CO_2C_{1-20}$alkylene, optionally substituted —C(=O)NH$C_{1-20}$alkylene.

In accordance with any of the aspects or embodiments described herein, $P_1$, $P_2$ or $P_3$ may be optionally substituted —$C_{1-6}$alkylene. For instance, $P_1$, $P_2$ or $P_3$ may be —$C_{1-6}$alkylene. $P_1$, $P_2$ and $P_3$ may each be optionally substituted —$C_{1-6}$alkylene, e.g. —$C_{1-6}$alkylene. Preferably, $P_1$, $P_2$ and $P_3$ may be each independently selected from optionally substituted —$CH_2CH_2$—, —$CH_2CH(CH_3)$—, —$CH(CH_3)CH_2$— or —$CH_2CH_2CH_2CH_2$—. In some embodiments the respective $P_1$, $P_2$ or $P_3$ groups is not optionally substituted.

In accordance with any of the aspects or embodiments described herein, at least one of $P_1$, $P_2$ or $P_3$ may be

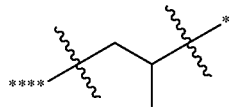

wherein (****) denotes the point of attachment to O and (*) denotes the point of attachment to E, F, G, D or B as appropriate;

D Groups

In accordance with any of the aspects or embodiments described herein, D may be an optionally substituted —$C_{1-6}$alkylene or absent. In embodiments, D may preferably be optionally substituted —$C_{1-6}$alkylene. In some embodiments, D is —$C_{1-6}$alkylene.

$R_1$ Groups

In accordance with any of the aspects or embodiments described herein, $R_1$ may be optionally substituted —$C_{1-6}$alkyl or H, e.g. $R_1$ may be —$C_{1-6}$alkyl. In embodiments, $R_1$ may be —$CH_3$, —$CH_2CH_3$, —$CH_2CH_2(CH_3)$, —$CH(CH_3)CH_3$ or —$CH_2CH_2CH_2CH_3$.

$R_2$ and $R_3$ Groups

In accordance with any of the aspects or embodiments described herein, $R_2$ and $R_3$ may independently be optionally substituted —$C_{1-6}$alkylene. In embodiments $R_2$ and $R_3$ may independently be —$CH_2CH_2$—, —$CH_2CH(CH_3)$—, —$CH(CH_3)CH_2$— or —$CH_2CH_2CH_2CH_2$—.

$R_4$ Groups

In accordance with any of the aspects or embodiments described herein, $R_4$ may be selected from optionally substituted —$C_{1-20}$alkyl, optionally substituted —$C_{2-20}$heteroalkyl, optionally substituted —$C_{3-6}$cycloalkyl, optionally substituted —$C_{3-6}$heterocycloalkyl, optionally substituted —$C_{2-6}$alkenyl, optionally substituted —$C_{2-6}$heteroalkenyl, optionally substituted —$C_{3-6}$cycloalkenyl, optionally substituted —$C_{3-6}$heterocycloalkenyl, optionally substituted —$C_{2-6}$alkynyl, optionally substituted —$C_{2-6}$heteroalkynyl, optionally substituted —$C_{6-14}$aryl or optionally substituted —$C_{5-14}$heteroaryl, optionally substituted —$C(=O)C_{1-20}$alkyl, optionally substituted —$CO_2C_{1-20}$alkyl, optionally substituted —$C(=O)NHC_{1-20}$alkyl, —$R_5NHR_6$, —$R_5OH$, —$R_5SH$, —$R_5NR_6$-$L_2$-X, —$R_5O$-$L_2$-X, —$R_5$—S-$L_2$-X, —$NHR_6$, —$NR_6$-$L_2$-X or -$L_2$-X, wherein $R_5$, $R_6$, $L_2$ and X are as defined herein.

In embodiments, $R_4$ may be selected from —$R_5NHR_6$, —$R_5NR_6$-$L_2$-X, —$NHR_6$ or —$NR_6$-$L_2$-X and B may be selected from —$NHR_1$ and —$NR_1$-$L_1$-X. Preferably, $R_4$ may be —$R_5NHR_6$ or —$R_5NR_6$-$L_2$-X. In such embodiments, wherein $R_5$, $R_6$, $L_1$, $L_2$ and X are as defined herein In other embodiments, $R_4$ may be optionally substituted —$C_{1-20}$alkyl.

$R_5$ Groups

In accordance with any of the aspects or embodiments described herein, $R_5$ may be optionally substituted —$C_{1-6}$alkylene. In some embodiments, $R_5$ is —$CH_2CH_2$—, —$CH_2CH(CH_3)$—, —$CH(CH_3)CH_2$— or —$CH_2CH_2CH_2CH_2$—.

$R_6$ Groups

In accordance with any of the aspects or embodiments described herein, $R_6$ may be optionally substituted —$C_{1-6}$alkylene, optionally substituted —$C_{1-6}$alkyl or H. In some embodiments, $R_6$ is —$CH_3$, —$CH_2CH_3$, —$CH_2CH_2(CH_3)$, —$CH(CH_3)CH_3$ or —$CH_2CH_2CH_2CH_3$. In other embodiments, $R_6$ is —$CH_2CH_2$—, —$CH_2CH(CH_3)$—, —$CH(CH_3)CH_2$— or —$CH_2CH_2CH_2CH_2$—.

$R_7$ and $R_8$ Groups

In accordance with any of the aspects or embodiments described herein, $R_7$ and $R_8$ may each independently be optionally substituted —$C_{1-6}$alkylene. $R_7$ and $R_8$ may each independently be —$CH_2CH_2$—, —$CH_2CH(CH_3)$—, —$CH(CH_3)CH_2$— or —$CH_2CH_2CH_2CH_2$—.

$R_9$ Groups

In accordance with any of the aspects or embodiments described herein, $R_9$ may be optionally substituted —$C_{1-6}$alkyl. In embodiments, $R_9$ may be —$CH_3$, —$CH_2CH_3$, —$CH_2CH_2(CH_3)$, —$CH(CH_3)CH_3$ or —$CH_2CH_2CH_2CH_3$.

$R_{10}$ Groups

In accordance with any of the aspects or embodiments described herein, $R_{10}$ may be optionally substituted —$C_{1-6}$alkyl or H. In embodiments, $R_{10}$ is —$CH_3$, —$CH_2CH_3$, —$CH_2CH_2(CH_3)$, —$CH(CH_3)CH_3$ or —$CH_2CH_2CH_2CH_3$.

B Groups

In accordance with any of the aspects or embodiments described herein, B may be selected from the group consisting of —$NHR_1$, —$OH$, —$SH$, —$NR_1$-$L_1$-X, —$O$-$L_1$-X and —$S$-$L_1$-X, wherein $R_1$, $L_1$ and X are as defined herein.

B may for instance be —$NR_1$-$L_1$-X or —$NHR_1$, wherein $R_1$, $L_1$ and X are as defined herein. In other embodiments, B is —$NR_1$-$L_1$-X wherein —$NR_1$-$L_1$-X when taken together are selected from

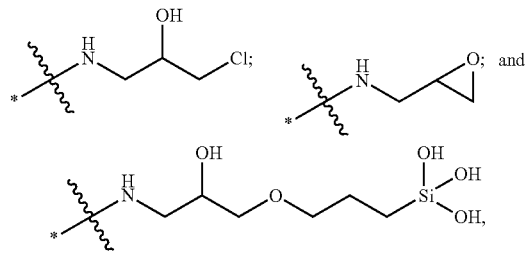

wherein (*) denotes the point of attachment to A.

In embodiments of any aspects of the invention described herein, e.g. the second aspect, when B is selected from the group consisting of —$NHR_1$, —$OH$ and —$SH$, the electrophilic moiety on the textile may be selected from

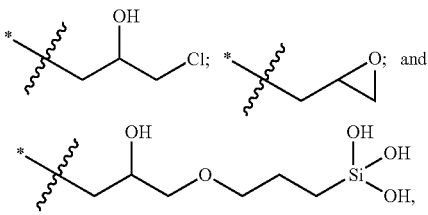

wherein (*) denotes the point of attachment to the textile.

$L_1$ groups

In accordance with any of the aspects or embodiments described herein, $L_1$ may be a linker with a chain length of from 1 to 10 atoms (i.e. in the shortest linear path). In some embodiments, $L_1$ is an optionally substituted —$C_{1-6}$alkylene. In other embodiments, $L_1$ is —$R_2OR_3$— wherein $R_2$ and $R_3$ are optionally substituted —$C_{1-6}$alkylene.

In accordance with any of the aspects or embodiments described herein, $L_1$ may be selected from:

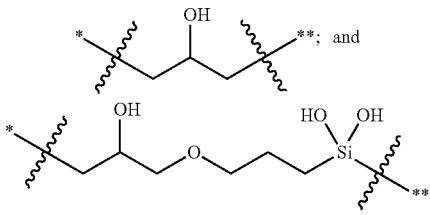

wherein (*) denotes the point of attachment to the respective N, O or S atom of the B group and (**) denotes the point of attachment to X.

$L_2$ Groups

In accordance with any of the aspects or embodiments described herein, $L_2$ may be a linker with a chain length having an integer from 1 to 10 atoms. In embodiments, $L_2$ may be an optionally substituted —$C_{1-6}$alkylene. In other embodiments, $L_2$ may be an —$R_7OR_8$— wherein $R_7$ and $R_8$ are optionally substituted —$C_{1-6}$alkylene.

In accordance with any of the aspects or embodiments described herein, $L_2$ may be selected from:

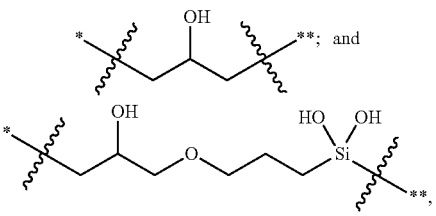

wherein (*) denotes the point of attachment to the respective N, O or S atom of the B group and (**) denotes the point of attachment to X.

$L_3$-$L_{12}$ Groups

According to the proviso that is associated with the second aspect of the invention described herein, $L_3$, $L_4$, $L_5$, $L_6$, $L_7$, $L_8$, $L_9$, $L_{10}$, $L_{11}$, and $L_{12}$ may each independently be selected from H;

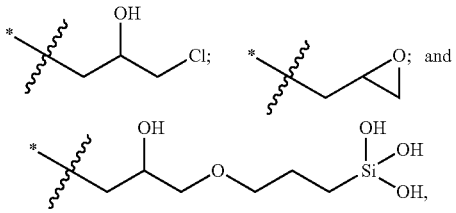

wherein (*) denotes the point of attachment to the respective —NH group found within the compounds of formulae (VI), (VII) and (VIII) as appropriate.

X Groups

In accordance with any of the aspects or embodiments described herein, X provides an electrophilic moiety capable of accepting electrons from a nucleophile to form a covalent bond.

Suitable electrophilic moieties include those which are capable of accepting electrons from a nucleophilic group on a textile. In embodiments of the invention, the electrophilic moiety is capable of accepting electrons from a nucleophilic group forming part of a textile to form a covalent bond between a compound of the formula (I) and the textile.

In accordance with any of the aspects or embodiments described herein, X may contain or may be a leaving group. Suitable leaving groups will be readily apparent to the skilled person and preferably include halides, e.g. F, Cl, Br, and I. X may comprise or contain an cyclic group capable of receiving electrons, e.g. an unsaturated group, or cyclic group such as one that is capable of undergoing ring-opening facilitated by nucleophilic substitution, e.g. an epoxide or aziridine. X may thus contain or be an epoxide. In some embodiments, the electrophilic moiety may be a carbon-halogen group, e.g. an alkylhalide, or may be a halide. X may be, or may contain, a Michael acceptor, such as an α,β-unsaturated carbonyl group or the like.

In accordance with any of the aspects or embodiments described herein X may be a halide or —OH. In embodiments, X may be Cl or OH.

Preferably, when $L_1$ and/or $L_2$ is

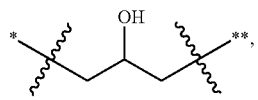

then X is Cl wherein (*) denotes the point of attachment to the respective N, O or S atom in the adjoining group and (**) denotes the point of attachment to X.

In other preferred embodiments, when $L_1$ and/or $L_2$ is

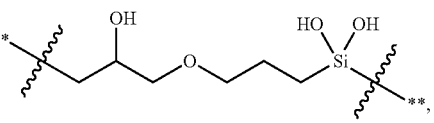

then X is —OH.

It will be appreciated that when X is OH, the OH group may form an $OH_2^+$ species under suitable reaction conditions (e.g. acidic conditions) to become prone to leaving under nucleophilic attack. In some embodiments, this —$OH_2^+$ species may then be displaced via a nucleophilic substitution reaction with a suitable nucleophilic group. Suitable nucleophilic groups may include nucleophiles or nucleophilic groups forming part of a textile, for example, —OH, —$NH_2$ or —SH groups.

—$NR_1$-$L_1$-X and —$R_5NR_6$-$L_2$-X— Groups

In accordance with any of the aspects or embodiments described herein, —$NR_1$-$L_1$-X when taken together may be selected from:

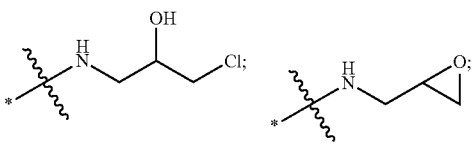

and

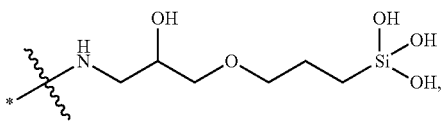

wherein (*) denotes the point of attachment to A as defined herein.

In accordance with any of the aspects or embodiments described herein —$R_5NR_6$-$L_2$-X— may be selected from:

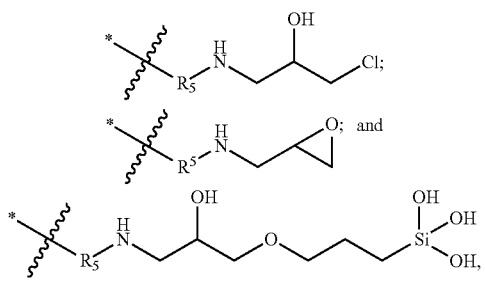

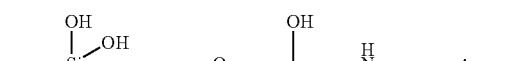

wherein (*) denotes the point of attachment to the polyether of formula (II) or (III) as defined herein and $R_5$ is as defined herein.

Further Embodiments of the Present Invention

In accordance with any of the aspects or embodiments described herein the compound of formula (I) may be:

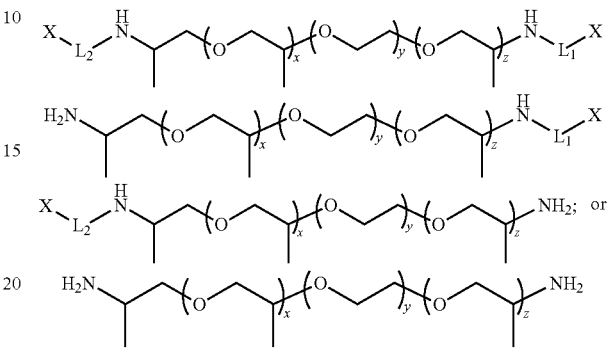

wherein X, $L_1$, $L_2$, x, y and z are as defined herein.

In accordance with any of the aspects or embodiments described herein the compound according to formula (I) may be:

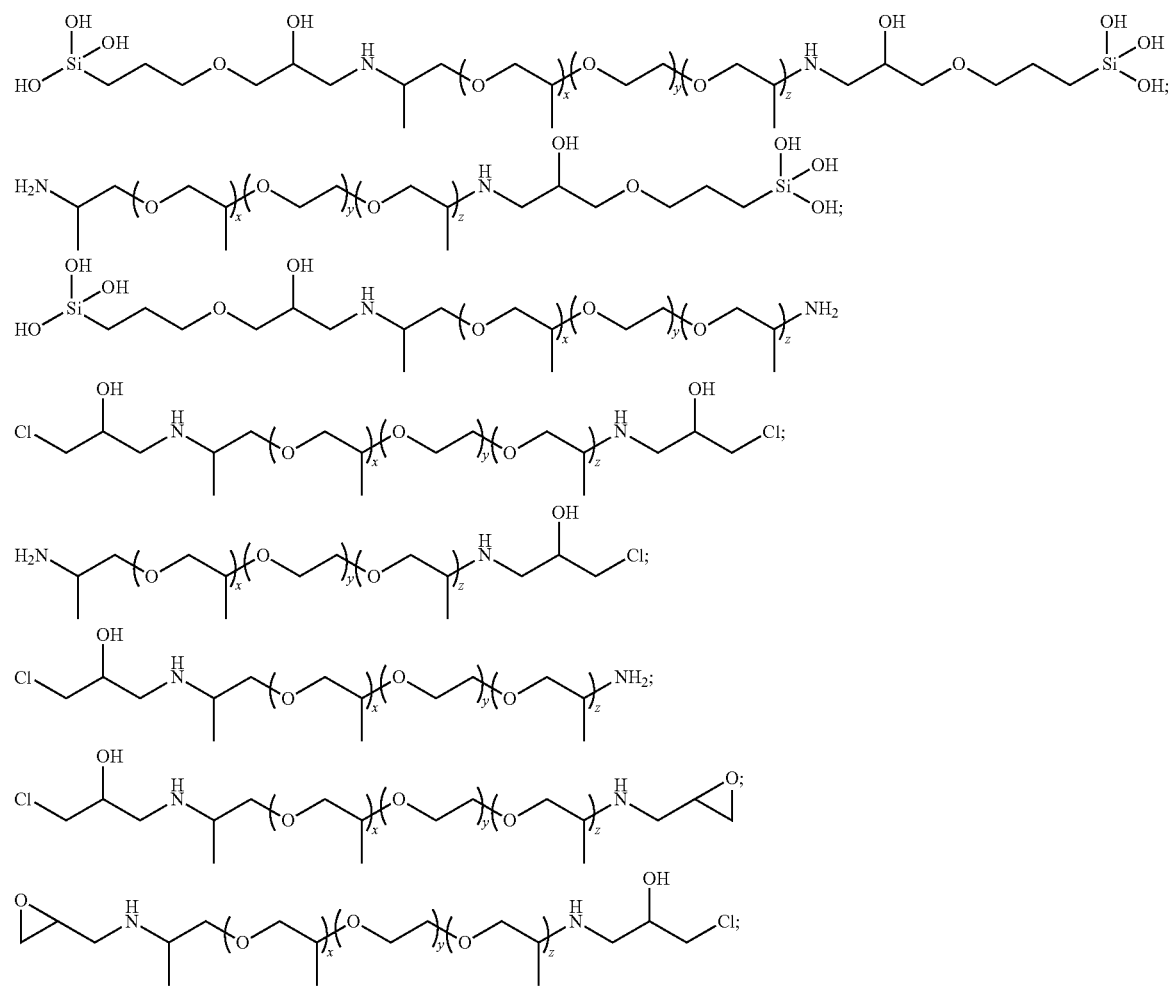

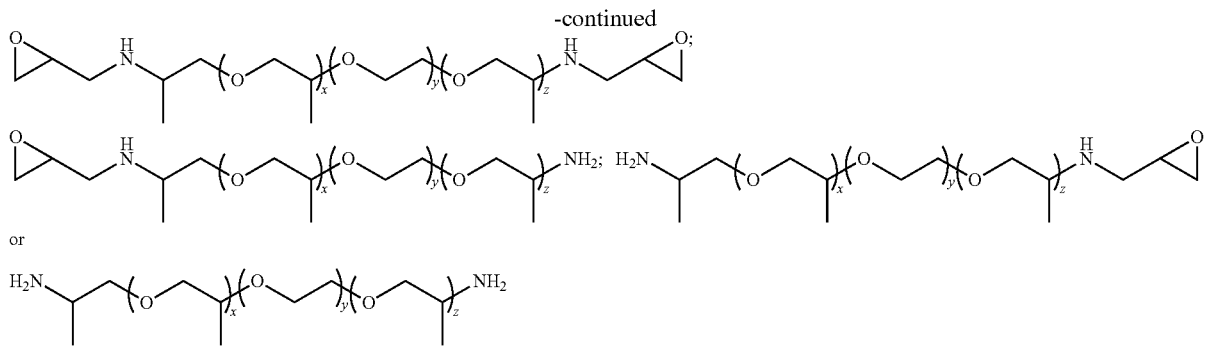

wherein x, y and z are as defined herein. Typically in such embodiments x+z is from 5 to 10 and y is from 35 to 45 or x+z is 6 and y is 39.

In accordance with the first, third and fourth aspects described herein the compound according to formula (I) compound may be

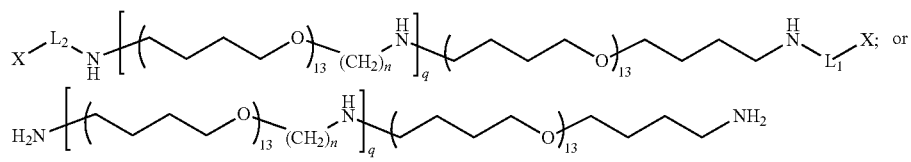

wherein X, $L_1$, $L_2$, n, and q are as defined according to any aspect or embodiment herein.

In accordance with the first, third and fourth aspects described herein, the compound according to formula (I) may be

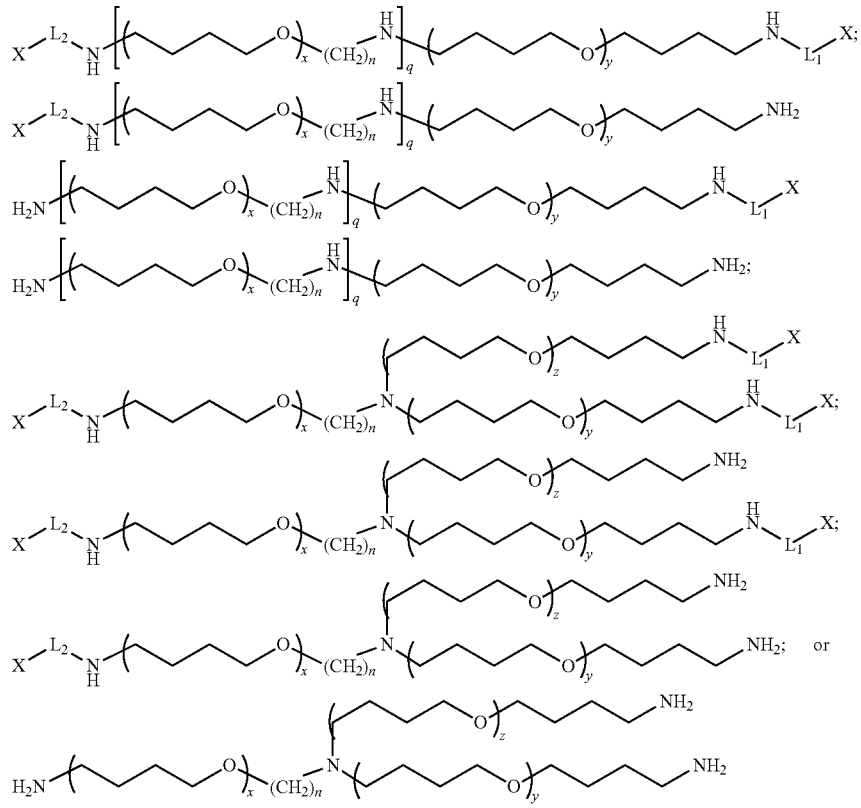

wherein X, L$_1$, L$_2$, x, y, z, q and n are as defined herein. Typically, in such embodiments, when —NH-L$_1$-X and —NH-L$_2$-X are present, each is independently selected from

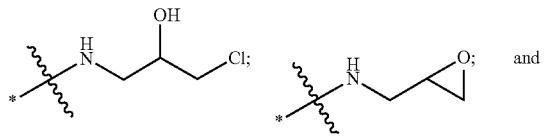

-continued

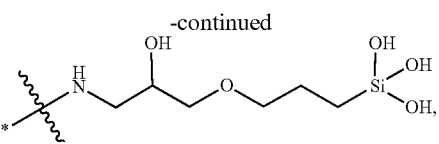

wherein (*) denotes the point of attachment to the rest of the compound of formula (I) as appropriate.

In accordance with the first, third and fourth aspects described herein the compound according to formula (I) may be:

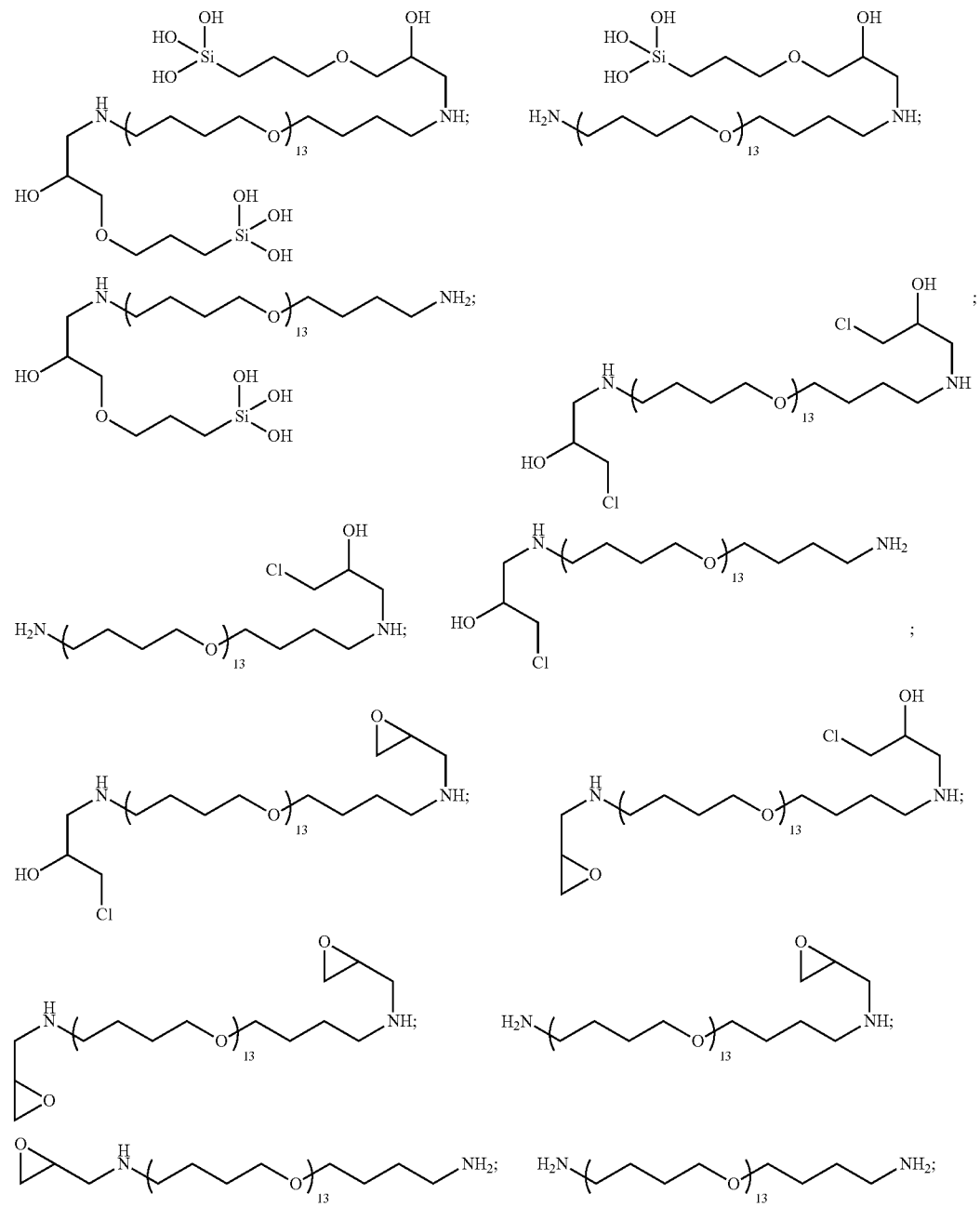

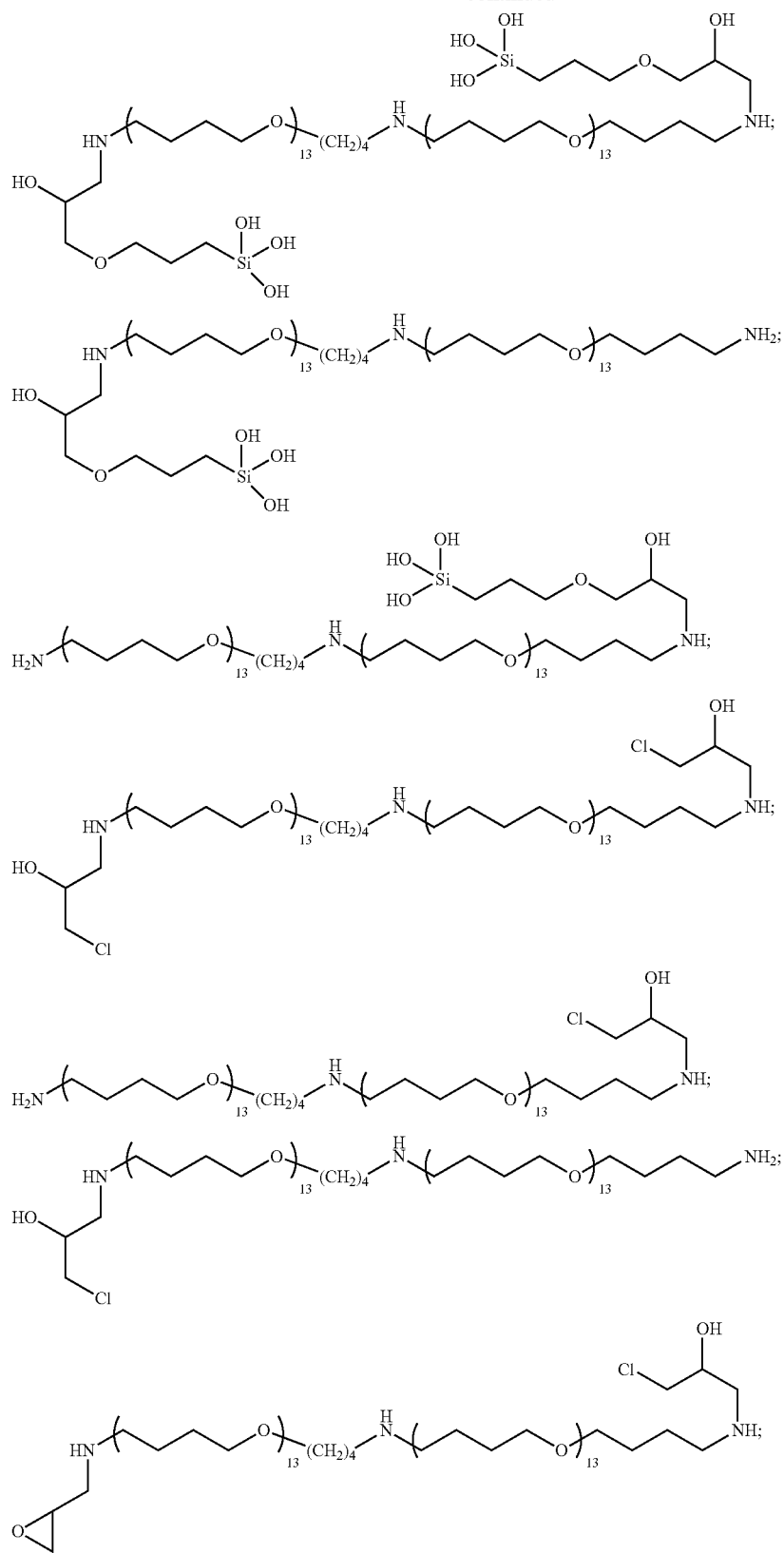

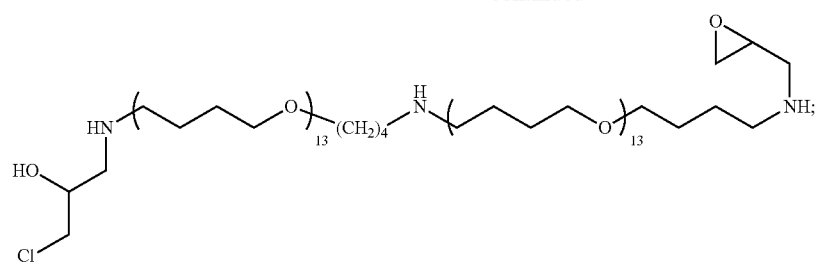
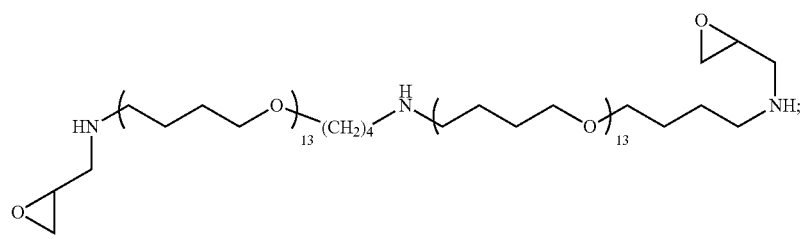
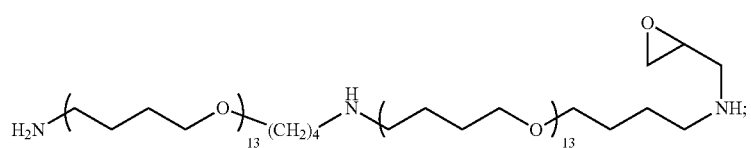
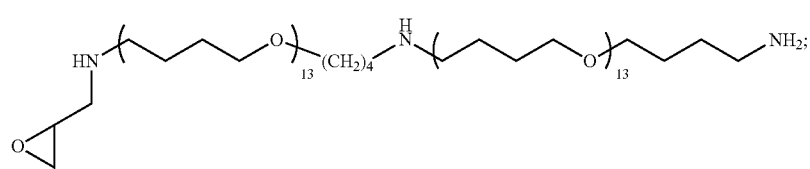
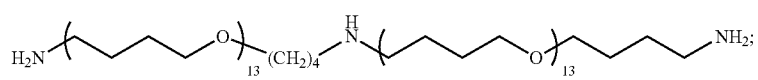
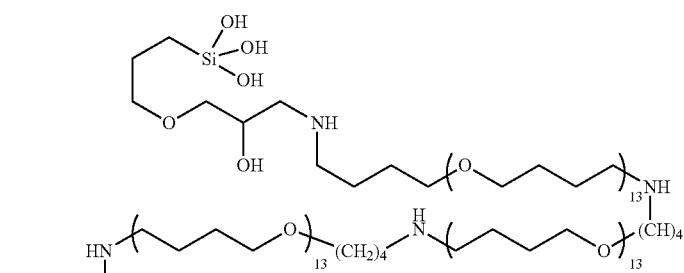
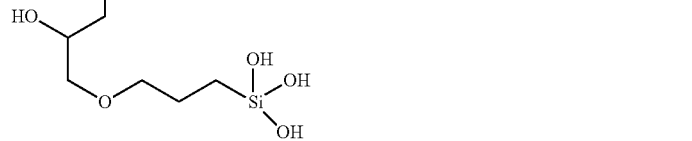
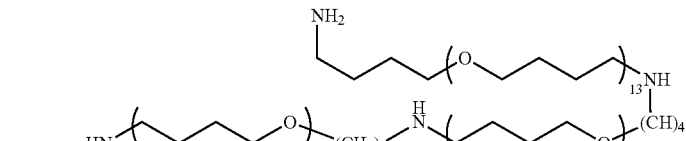
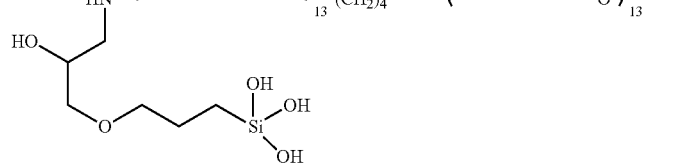

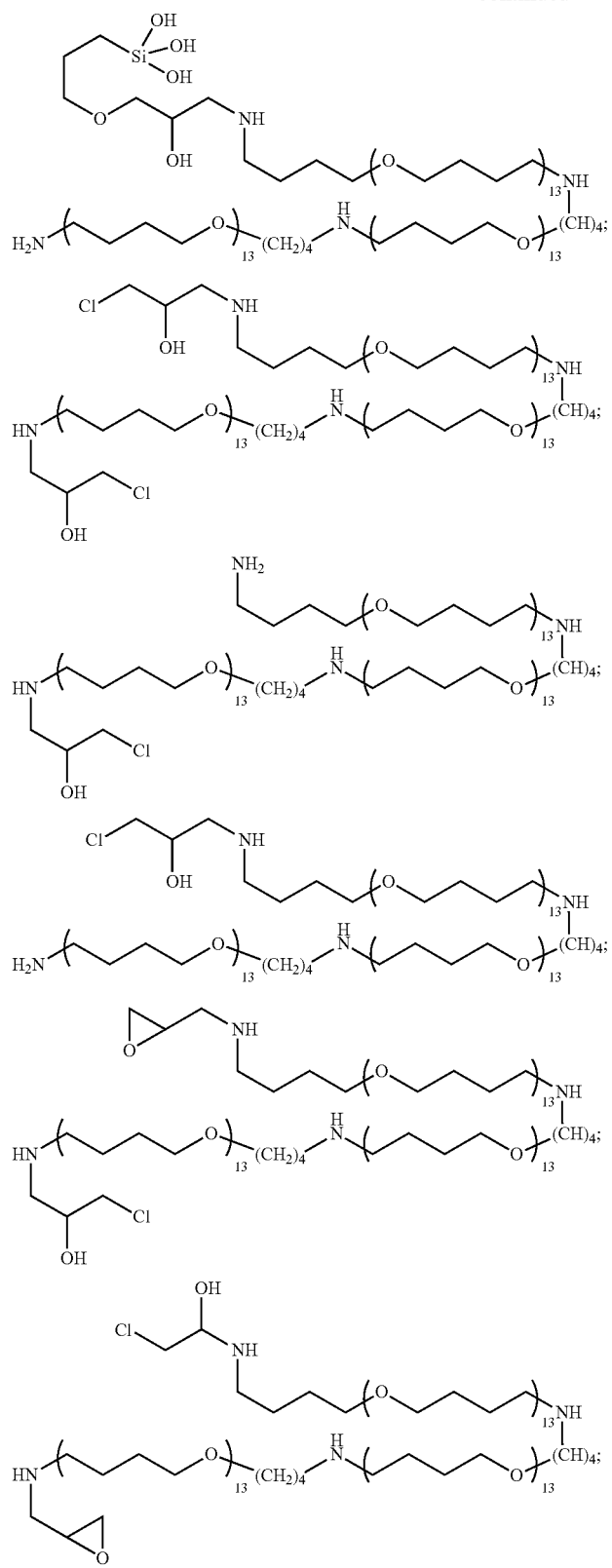

-continued
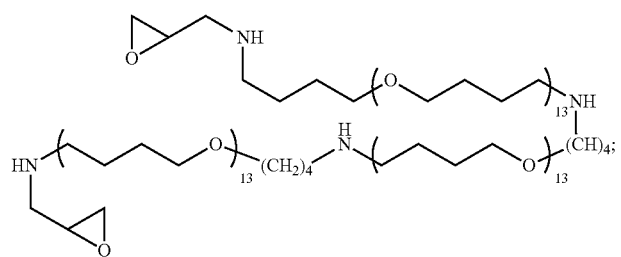
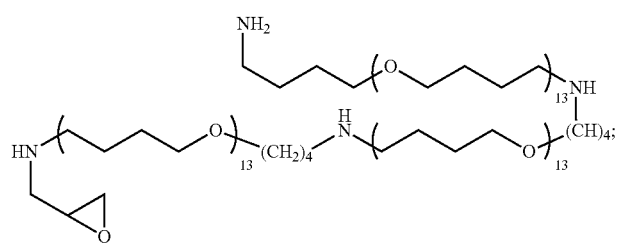
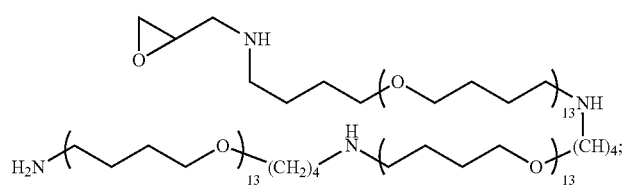
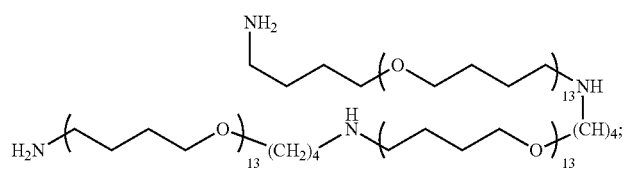
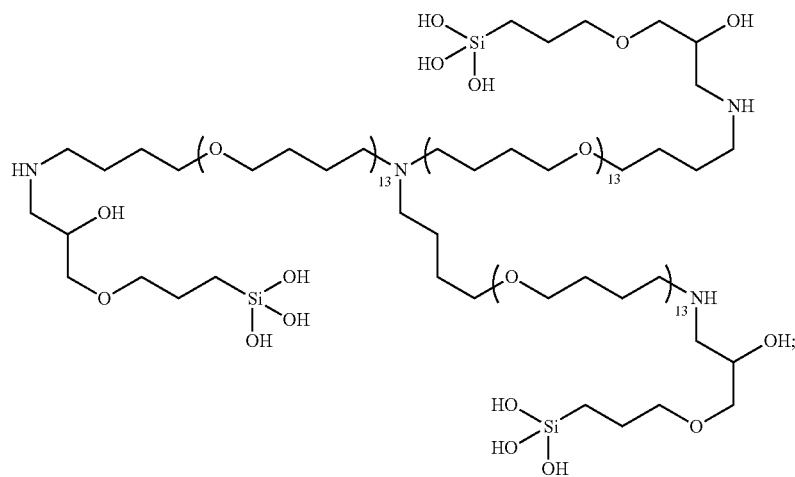

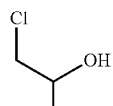
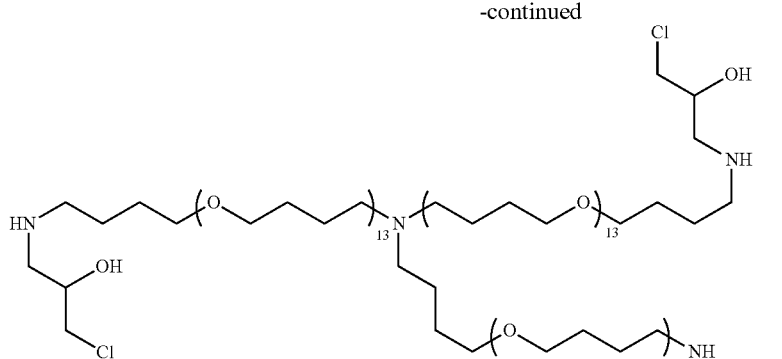
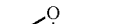
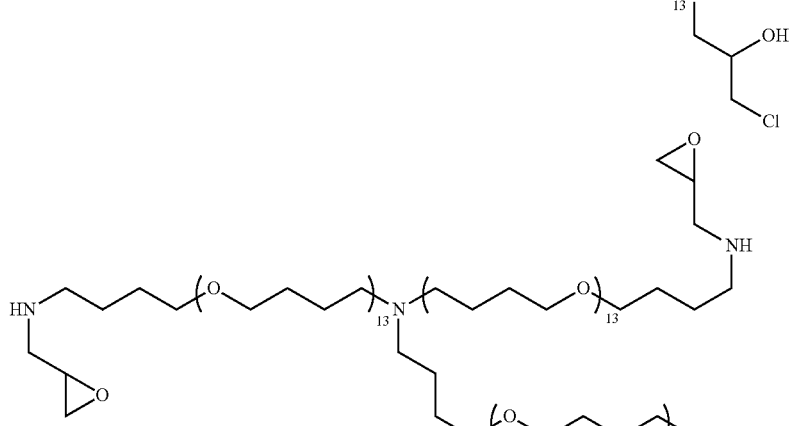
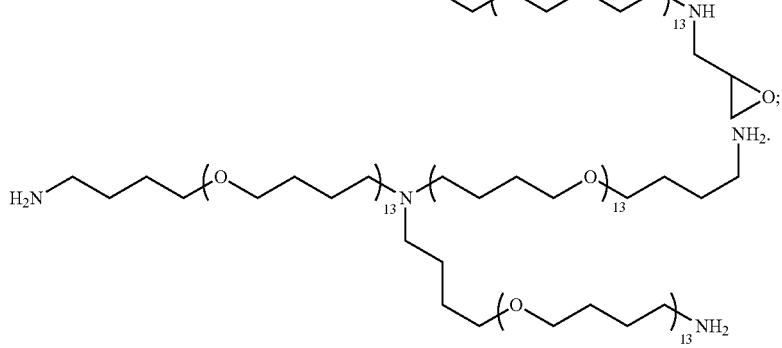
In accordance with any of the aspects or embodiments described herein, the compound of formula (I) may be
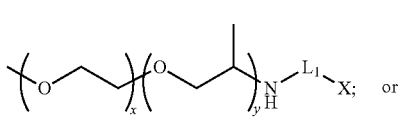
wherein X, L₁, x and y are as defined herein.
In accordance with any of the aspects or embodiments described herein the compound of formula (I) may be
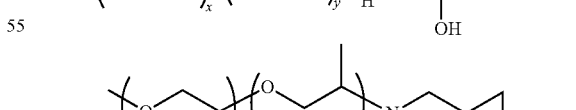
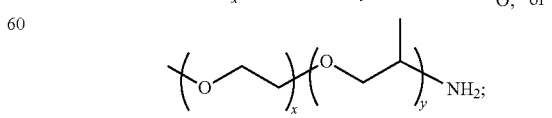
wherein x and y are as defined herein. Typically, in such embodiments, the ratio of x to y may be from about 1:20 to about 20:1 or the ratio of x to y may be about 11:1. In some embodiments, the ratio of x to y may be from about 1:20 to about 20:1 and the average molecular weight may be about 2000. In further embodiments, the ratio of x to y may be about 11:1 and the average molecular weight may be about 2000.

Compounds which may be Excluded in Aspects of the Present Invention

In some embodiments of the invention, for instance in the case of compounds described in the second aspect of the invention, the compound of the formula (I) is not (or excludes) a diamine compound. A diamine compound includes any compound which includes two amino groups. Amino group means "—$NH_2$".

In some embodiments of the invention, for instance in the case of compounds described in the second aspect of the invention, the compound of the formula (I) is not (i.e. excludes) triamine compounds. A triamine compound is any compound which includes three amino groups. Amino group means "—$NH_2$".

In some embodiments of the invention, such as the second aspect of the invention, the compound of the formula (I) is not (or excludes) compounds wherein A is polyether of the formula (II):

(II)

wherein (***) denotes the point of attachment to B;
E is

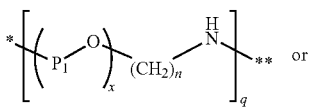 or

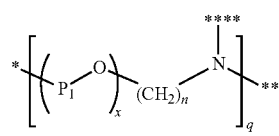

wherein (*) denotes the point of attachment to $R_4$, () denotes the point of attachment to F, G, D or B as appropriate, and (**) denote the point of attachment to another separately independent F, G, D or B as appropriate; and $R_4$, F, G, D, $P_1$, x, q and n are as defined herein above.

In some embodiments of the invention, such as the second aspect of the invention, the compound of the formula (I) is not (or excludes) compounds wherein A is polyether of the formula (II):

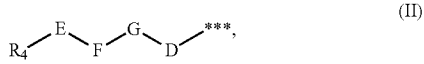
(II)

wherein (***) denotes the point of attachment to B;
F is

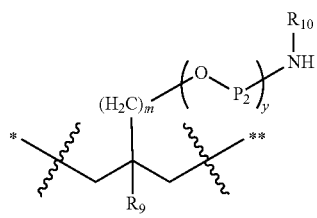

wherein (*) denotes the point of attachment to E or $R_4$ as appropriate and (**) denotes the point of attachment to G, D or B as appropriate; and $P_2$, $R_9$, $R_{10}$, y, m, $R_4$, E, G, D are as defined according to any embodiment described herein above.

Average Molecular Weight

In accordance with any of the aspects or embodiments described herein, the compound according to formula (I) may have an average molecular weight of from about 100 to about 6000. The compound according to formula (I) may have an average molecular weight of from about 1000 to about 4000. The compound according to formula (I) may have an average molecular weight of from about 1500 to about 3500.

The compound according to formula (I) may have an average molecular weight of from about 1700 to about 3000. The compound according to formula (I) may have an average molecular weight of from about 1700 to about 2500. The compound according to formula (I) may have an average molecular weight of from about 2000 to about 2500, e.g. about 2000.

Melting Point

In accordance with any of the aspects or embodiments described herein, the melting point of the compound according to formula (I) may be from about 5° C. to about 55° C. The compound according to formula (I) may be from about 20° C. to about 45° C. The melting point of the compound according to formula (I) may be from about 15° C. to about 35° C. The melting point of the compound according to formula (I) may be from about 20° C. to about 35° C.

Enthalpy of Fusion for Compounds According to Formula (I)

In accordance with any of the aspects or embodiments described herein, the compound according to formula (I) may have an enthalpy of fusion from about 5 J/g to about 400 J/g, about 5 J/g to about 300 J/g, about 5 J/g to about 200 J/g, about 5 J/g to about 100 J/g, about 100 J/g to about 400 J/g, about 100 J/g to about 300 J/g, about 100 J/g to about 200 J/g, about 200 J/g to about 400 J/g, about 250 J/g to about 400 J/g, about 300 J/g to about 400 J/g, about 350 J/g to about 400 J/g.

In accordance with any of the aspects or embodiments described herein, the compound according to formula (I) may have an enthalpy of fusion of about 5 J/g, about 10 J/g, about 15 J/g, about 20 J/g, about 25 J/g, about 30 J/g, about 35 J/g, about 40 J/g, about 45 J/g, about 50 J/g, about 55 J/g, about 60 J/g, about 65 J/g, about 70 J/g, about 75 J/g, about 80 J/g, about 85 J/g, about 90 J/g, about 95 J/g, about 100 J/g, about 110 J/g, about 120 J/g, about 130 J/g, about 140 J/g, about 150 J/g, about 160 J/g, about 170 J/g, about 180 J/g, about 190 J/g or about 200 J/g.

Enthalpy of Fusion for the Treated Textiles

As mentioned above, the temperature regulating articles or textiles of the present invention, in particular second and third aspects, have measurable enthalpy of fusion values. The enthalpy of fusion values can be used to measure the temperature regulating performance of the temperature regulating articles and textiles. The skilled person will appreciate that this can be done using known differential scanning calorimetry known in the art.

In accordance with the second and third aspects of the present invention as described herein, the temperature regulating textile may have an enthalpy of fusion of from about 100 J/m² to about 3000 J/m², about 100 J/m² to about 2000 J/m², about 100 J/m² to about 1900 J/m², about 100 J/m² to about 1800 J/m², about 100 J/m² to about 1700 J/m², about 100 J/m² to about 1600 J/m², about 100 J/m² to about 1500 J/m², about 100 J/m² to about 1400 J/m², about 100 J/m² to about 1300 J/m², about 100 J/m² to about 1200 J/m², about 100 J/m² to about 1100 J/m², about 100 J/m² to about 1000 J/m², about 100 J/m² to about 900 J/m², about 100 J/m² to about 800 J/m², about 100 J/m² to about 700 J/m², about 100 J/m² to about 600 J/m², about 100 J/m² to about 500 J/m² or about 100 J/m² to about 400 J/m².

In accordance with the second and third aspects of the present invention as described herein, the temperature regulating textile may have an enthalpy of fusion of from about 500 J/m² to about 1500 J/m², about 600 J/m² to about 1400 J/m², about 700 J/m² to about 1300 J/m², about 800 J/m² to about 1200 J/m² or about 900 J/m² to about 1100.

In accordance with the second and third aspects of the present invention as described herein, the temperature regulating textile may have an enthalpy of fusion of from about 500 J/m² to about 1500 J/m², about 600 J/m² to about 1400 J/m², about 700 J/m² to about 1300 J/m², about 800 J/m² to about 1200 J/m² or about 900 J/m² to about 1100.

In accordance with the second and third aspects of the present invention as described herein, the temperature regulating textile may have an enthalpy of fusion of about 150 J/m², about 200 J/m², about 250 J/m², about 300 J/m², about 350 J/m², about 400 J/m², about 450 J/m², about 500 J/m², about 550 J/m², about 600 J/m², about 650 J/m², about 700 J/m², about 750 J/m², about 800 J/m², about 850 J/m², about 900 J/m², about 950 J/m², about 1000 J/m², about 1050 J/m², about 1100 J/m², about 1150 J/m², about 1200 J/m², about 1250 J/m², about 1300 J/m², about 1350 J/m², about 1400 J/m², about 1450 J/m² or about 1500 J/m².

Combination of Compounds with Different Melting Points

It will be appreciated any of the aspects or embodiments described herein may include one or more compounds (i.e. combinations of compounds) as defined herein according to formula (I). In any of the aspects or embodiments described herein (e.g. the uses or methods described herein), a combination of two or more compounds according to any one of formulae (I)-(V) may be provided. It will appreciated that a combination of one or more compound having different melting points may enhanced the temperature regulating effect as described herein (i.e. the cooling effect).

If a combination of compounds of the formula (I) is used, the compounds may possess different melting points (e.g. when using a combination of compounds A, B and C then the melting points of A may be 15° C., B may be 25° C. and C may be 15° C.). When such a combination of compounds are used in aspects and embodiments as described herein, the temperature regulating effect may be achieved over a broader temperature range (e.g. 15° C. to 40° C.).

In accordance with any of the aspects or embodiments described herein, there may be a combination of two or more compounds as defined herein according to the formula (I), e.g. for the respective use or method. In a particular embodiment of the present invention there is a combination of any two or more of the compounds selected from the list consisting of:

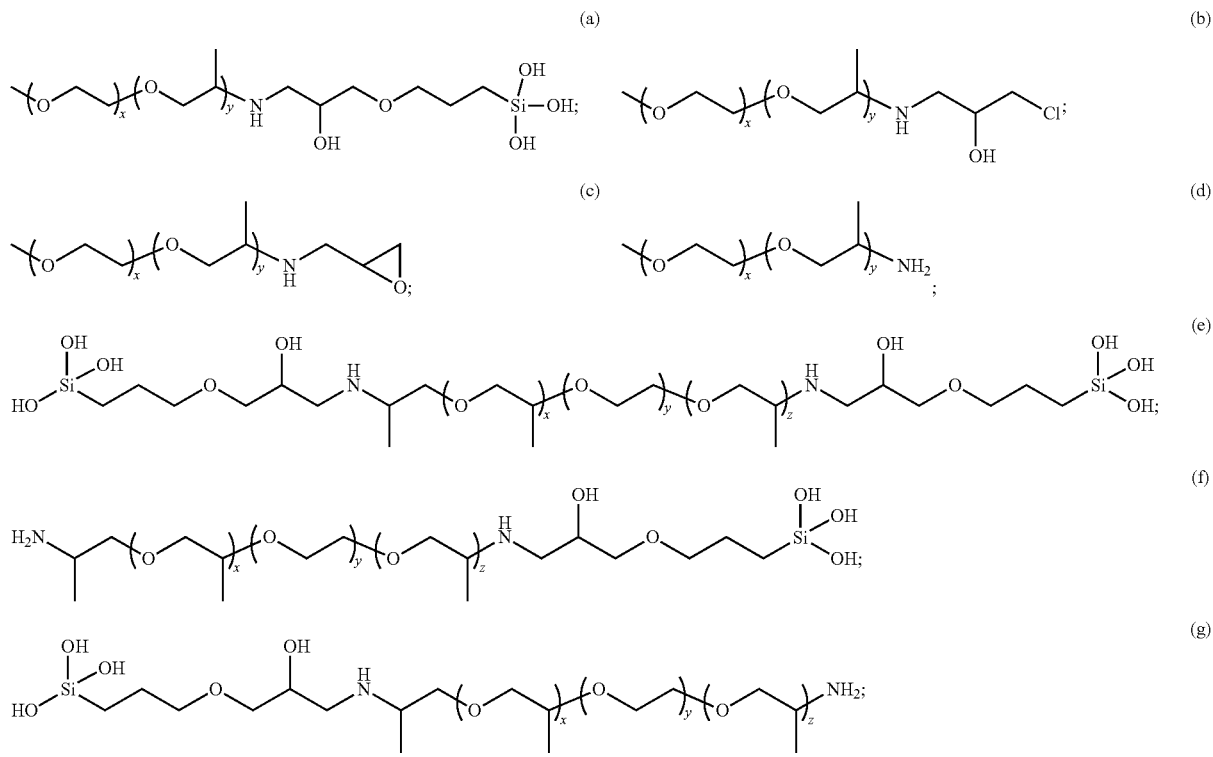

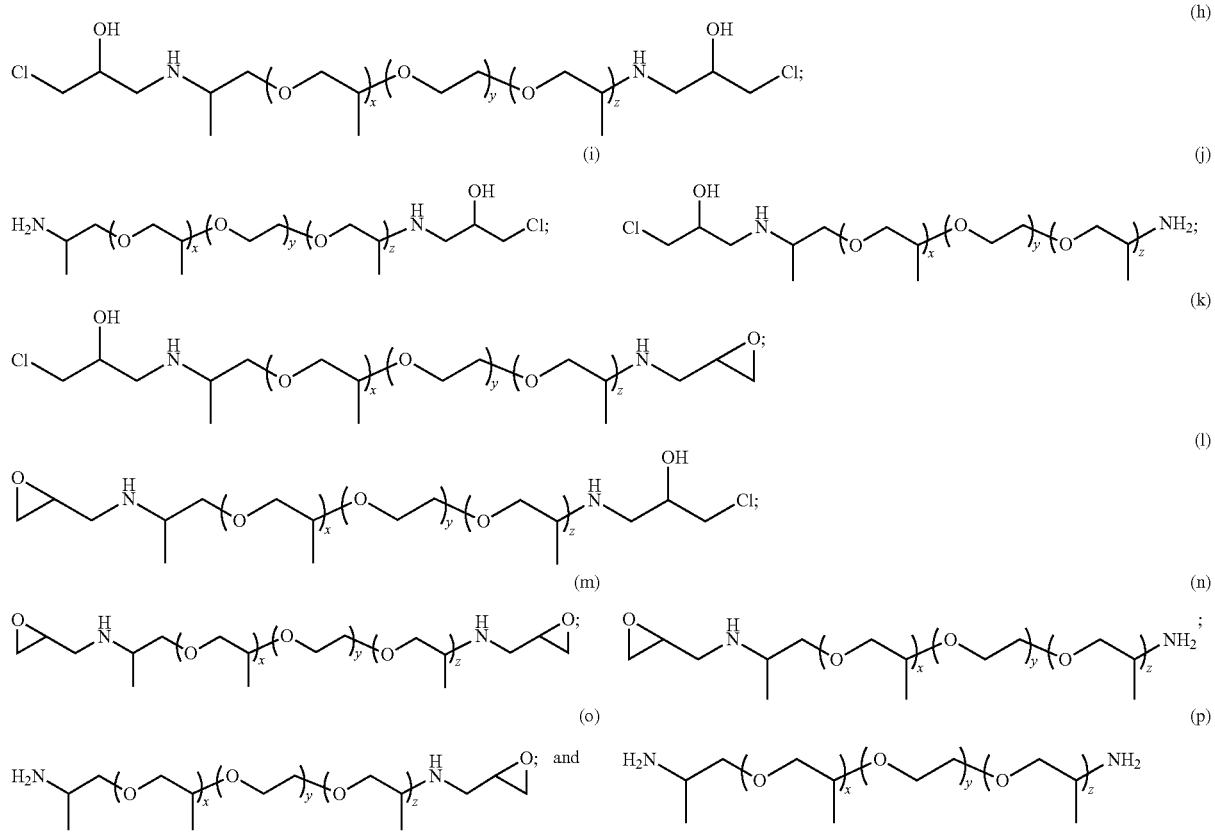

wherein for compounds of the formula (a-d) x and y are as defined herein, for example, the ratio of x to y may be from about 1:20 to about 20:1 or the ratio of x to y may be about 11:1 or the ratio of x to y may be about 11:1 and the average molecular weight may be about 2000; and for compounds of the formula (e-p) x, y and z are as defined herein, for example, x+z is from 5 to 10 and y is from 35 to 45 or x+z is 6 and y is 39.

Stereochemistry

Compounds of the present invention may include one or more centres wherein the stereochemistry may be S or R. For example, in some embodiments, when $L_1$ and/or $L_2$ is

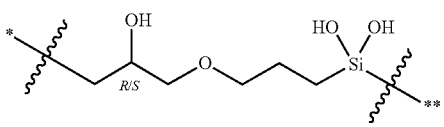

then the stereochemistry of the centre to which —OH is attached (denoted by R/S) may be S or R.

All enantiomeric and diastereomeric embodiments are intended to be encompassed by the present invention. Individual enantiomeric/diastereoisomers are included within the scope of the invention. Mixtures of isomers, e.g. racemic mixtures and/or diastereomeric mixtures may also be provided.

Substituents

Where groups of the invention are described as being "optionally substituted groups" (e.g. optionally substituted alkyl, cycloalkyl, alkoxy, alkenyl, cycloalkenyl, alkynyl, alkylene, alkenylene, heteroalkyl, heterocycloalkyl, heteroalkenyl, heterocycloalkenyl, heteroalkynyl, heteroalkylene, heteroalkenylene, aryl, arylalkyl, arylheteroalkyl, heteroaryl, heteroarylalkyl or heteroarylheteroalkyl groups, etc.) the respective group may be substituted or unsubstituted, for instance unsubstituted. Typically, substitution involves the notional replacement of a hydrogen atom with a substituent group, or two hydrogen atoms in the case of substitution by =O.

Where substituents are present, there may, for instance, be from 1 to 6 substituents, depending on the available substituent positions of the group. Typically there will be from 1 to 3 substituents, in embodiments 1 or 2 substituents, such as only 1 substituent.

In such embodiments, the optional substituent(s) may each independently be —$C_{1-6}$alkyl, —$C_{2-6}$heteroalkyl, —$C_{3-6}$cycloalkyl, —$C_{3-6}$heterocycloalkyl, —$C_{2-6}$alkenyl, —$C_{2-6}$heteroalkenyl, —$C_{3-6}$cycloalkenyl, —$C_{3-6}$heterocycloalkenyl, —$C_{2-6}$alkynyl, —$C_{2-6}$heteroalkynyl, halogen, —$C_{1-6}$haloalkyl (e.g. trihalomethyl, trihaloethyl), —OH, —$NH_2$, —$NO_2$, —CN, —$N^+(C_{1-6}alkyl)_2O-$, —$CO_2H$, —$CO_2C_{1-6}$alkyl, —OC(=O)O$C_{1-6}$alkyl, —C(=O)H, —C(=O)$C_{1-6}$alkyl, —OC(=O)$C_{1-6}$alkyl, =O, —N($C_{1-6}$alkyl)$_2$, —C(=O)$NH_2$, —C(=O)N($C_{1-6}$alkyl)$_2$, —N($C_{1-6}$alkyl)C(=O)O($C_{1-6}$alkyl), —N($C_{1-6}$alkyl)C(=O)N($C_{1-6}$alkyl)$_2$, —OC(=O)N($C_{1-6}$alkyl)$_2$, —N($C_{1-6}$alkyl)C(=O)$C_{1-6}$alkyl, —$C_{1-6}$alkyl, —$C_{2-6}$heteroalkyl, —$C_{3-6}$cycloalkyl, —$C_{3-6}$heterocycloalkyl, —$C_{2-6}$alkenyl, —$C_{2-6}$heteroalkenyl, —$C_{3-6}$cycloalkenyl, —$C_{3-6}$heterocycloalkenyl, —$C_{2-6}$alkynyl, or —$C_{2-6}$heteroalkynyl.

In other embodiments, the optional substituent(s) is/are each independently —$C_{1-6}$alkyl, —$C_{2-6}$heteroalkyl, halogen, —$C_{1-6}$haloalkyl, —OH or =O.

Chemical Groups

Halo

The term "halogen" (or "halo") includes fluorine, chlorine, bromine and iodine.

Alkyl, alkylene, alkenyl, alkynyl, cycloalkyl etc.

The terms "alkyl", "alkylene", "alkenyl" or "alkynyl" are used herein to refer to both straight and branched chain acyclic forms. Cyclic analogues thereof are referred to as cycloalkyl, etc.

The term "alkyl" includes monovalent, straight or branched, saturated, acyclic hydrocarbyl groups. In embodiments, alkyl is $C_{1-10}$alkyl, in another embodiment $C_{1-6}$alkyl, in another embodiment $C_{1-4}$alkyl, such as methyl, ethyl, n-propyl, i-propyl or t-butyl groups.

The term "cycloalkyl" includes monovalent, saturated, cyclic hydrocarbyl groups. In one embodiment cycloalkyl is $C_{3-10}$cycloalkyl, in another embodiment $C_{3-6}$cycloalkyl such as cyclopentyl and cyclohexyl.

The term "alkoxy" means alkyl-O—. The term "alkylamino" means alkyl-NH—.

The term "haloalkyl" refers to an alkyl group wherein at least one H is replaced by a halo group. In embodiments, haloalkyl refers to substitution by from 1-3 halo groups, e.g. 1. Examples include trihalomethyl, trihaloethyl, e.g. trifluoromethyl, etc.

The term "alkenyl" includes monovalent, straight or branched, unsaturated, acyclic hydrocarbyl groups having at least one carbon-carbon double bond and, in one embodiment, no carbon-carbon triple bonds. In one embodiment alkenyl is $C_{2-10}$alkenyl, in another embodiment $C_{2-6}$alkenyl, in another embodiment $C_{2-4}$alkenyl.

The term "cycloalkenyl" includes monovalent, partially unsaturated, cyclic hydrocarbyl groups having at least one carbon-carbon double bond and, in one embodiment, no carbon-carbon triple bonds. In embodiments, cycloalkenyl is $C_{3-10}$cycloalkenyl, in another embodiment $C_{5-10}$cycloalkenyl, e.g. cyclohexenyl or benzocyclohexyl.

The term "alkynyl" includes monovalent, straight or branched, unsaturated, acyclic hydrocarbyl groups having at least one carbon-carbon triple bond and, in one embodiment, no carbon-carbon double bonds. In one embodiment, alkynyl is $C_{2-10}$alkynyl, in another embodiment $C_{2-6}$alkynyl, in another embodiment $C_{2-4}$alkynyl.

The term "alkylene" includes divalent, straight or branched, saturated, acyclic hydrocarbyl groups. In one embodiment alkylene is $C_{1-10}$alkylene, in another embodiment $C_{1-6}$alkylene, in another embodiment $C_{1-4}$alkylene, such as methylene, ethylene, n-propylene, i-propylene or t-butylene groups.

The term "alkenylene" includes divalent, straight or branched, unsaturated, acyclic hydrocarbyl groups having at least one carbon-carbon double bond and, in one embodiment, no carbon-carbon triple bonds. In one embodiment alkenylene is $C_{2-10}$alkenylene, in another embodiment $C_{2-6}$alkenylene, in another embodiment $C_{2-4}$alkenylene.

Heteroalkyl, etc.

The term "heteroalkyl" includes alkyl groups in which up to three carbon atoms, in one embodiment up to two carbon atoms, in another embodiment one carbon atom, are each replaced independently by O, $S(O)_t$ or N, provided at least one of the alkyl carbon atoms remains. The heteroalkyl group may be C-linked or hetero-linked, i.e. it may be linked to the remainder of the molecule through a carbon atom or through O, $S(O)_t$ or N, wherein t is defined below.

The term "heterocycloalkyl" includes cycloalkyl groups in which up to three carbon atoms, in one embodiment up to two carbon atoms, in another embodiment one carbon atom, are each replaced independently by O, $S(O)_t$ or N provided at least one of the cycloalkyl carbon atoms remains. Examples of heterocycloalkyl groups include oxiranyl, thiaranyl, aziridinyl, oxetanyl, thiatanyl, azetidinyl, tetrahydrofuranyl, tetrahydrothiophenyl, pyrrolidinyl, tetrahydropyranyl, tetrahydrothiopyranyl, piperidinyl, 1,4-dioxanyl, 1,4-oxathianyl, morpholinyl, 1,4-dithianyl, piperazinyl, 1,4-azathianyl, oxepanyl, thiepanyl, azepanyl, 1,4-dioxepanyl, 1,4-oxathiepanyl, 1,4-oxaazepanyl, 1,4-dithiepanyl, 1,4-thieazepanyl and 1,4-diazepanyl. The heterocycloalkyl group may be C-linked or N-linked, i.e. it may be linked to the remainder of the molecule through a carbon atom or through a nitrogen atom.

The term "heteroalkenyl" includes alkenyl groups in which up to three carbon atoms, in one embodiment up to two carbon atoms, in another embodiment one carbon atom, are each replaced independently by O, $S(O)_t$ or N provided at least one of the alkenyl carbon atoms remains. The heteroalkenyl group may be C-linked or hetero-linked, i.e. it may be linked to the remainder of the molecule through a carbon atom or through O, $S(O)_t$ or N.

The term "heterocycloalkenyl" includes cycloalkenyl groups in which up to three carbon atoms, in one embodiment up to two carbon atoms, in another embodiment one carbon atom, are each replaced independently by O, $S(O)_t$ or N, provided at least one of the cycloalkenyl carbon atoms remains. Examples of heterocycloalkenyl groups include 3,4-dihydro-2H-pyranyl, 5-6-dihydro-2H-pyranyl, 2H-pyranyl, 1,2,3,4-tetrahydropyridinyl and 1,2,5,6-tetrahydropyridinyl. The heterocycloalkenyl group may be C-linked or N-linked, i.e. it may be linked to the remainder of the molecule through a carbon atom or through a nitrogen atom.

The term "heteroalkynyl" includes alkynyl groups in which up to three carbon atoms, in one embodiment up to two carbon atoms, in another embodiment one carbon atom, are each replaced independently by O, $S(O)_t$ or N, provided at least one of the alkynyl carbon atoms remains. The heteroalkynyl group may be C-linked or hetero-linked, i.e. it may be linked to the remainder of the molecule through a carbon atom or through O, $S(O)_t$ or N.

The term "heteroalkylene" includes alkylene groups in which up to three carbon atoms, in one embodiment up to two carbon atoms, in another embodiment one carbon atom, are each replaced independently by O, $S(O)_t$ or N, provided at least one of the alkylene carbon atoms remains.

The term "heteroalkenylene" includes alkenylene groups in which up to three carbon atoms, in one embodiment up to two carbon atoms, in another embodiment one carbon atom, are each replaced independently by O, $S(O)_t$ or N, provided at least one of the alkenylene carbon atoms remains.

Aryl

The term "aryl" includes monovalent, aromatic, cyclic hydrocarbyl groups, such as phenyl or naphthyl (e.g. 1-naphthyl or 2-naphthyl). In general, the aryl groups may be monocyclic or polycyclic fused ring aromatic groups. Preferred aryl groups are $C_6$—$C_{14}$aryl.

Other examples of aryl groups are monovalent derivatives of aceanthrylene, acenaphthylene, acephenanthrylene, anthracene, azulene, chrysene, coronene, fluoranthene, fluorene, as-indacene, s-indacene, indene, naphthalene, ovalene, perylene, phenalene, phenanthrene, picene, pleiadene, pyrene, pyranthrene and rubicene.

The term "arylalkyl" means alkyl substituted with an aryl group, e.g. benzyl.

Heteroaryl

The term "heteroaryl" includes aryl groups in which one or more carbon atoms are each replaced by heteroatoms independently selected from O, S, N and NR$^N$, where R$^N$ is defined below (and in one embodiment is H or alkyl (e.g. C$_{1-6}$alkyl)).

In general, the heteroaryl groups may be monocyclic or polycyclic (e.g. bicyclic) fused ring heteroaromatic groups. Typically, heteroaryl groups contain 5-14 ring members (preferably 5-10 members) wherein 1, 2, 3 or 4 ring members are independently selected from O, S, N and NRN. In one embodiment, a heteroaryl group may be 5, 6, 9 or 10 membered, e.g. 5-membered monocyclic, 6-membered monocyclic, 9-membered fused-ring bicyclic or 10-membered fused-ring bicyclic.

Monocyclic heteroaromatic groups include heteroaromatic groups containing 5-6 ring members wherein 1, 2, 3 or 4 ring members are independently selected from O, S, N or NRN.

Bicyclic heteroaromatic groups include fused-ring heteroaromatic groups containing 9-14 ring members wherein 1, 2, 3, 4 or more ring members are independently selected from O, S, N or NR$^N$.

The term "heteroarylalkyl" means alkyl substituted with a heteroaryl group.

Where mentioned above, RN is H, alkyl, cycloalkyl, aryl, heteroaryl, —C(O)-alkyl, —C(O)-aryl, —C(O)-heteroaryl, —S(O)$_t$-alkyl, —S(O)$_t$-aryl or —S(O)$_t$-heteroaryl. R$^N$ may, in particular, be H, alkyl (e.g. C$_{1-6}$alkyl) or cycloalkyl (e.g. C$_{3-6}$cycloalkyl).

Where mentioned above, t is independently 0, 1 or 2, for example 2. Typically, t is 0.

Copolymers

It will be understood that compounds according to formula (I) as defined herein may be copolymers. This may include linear copolymers or branched copolymers. Such copolymers may include alternating copolymers, random copolymers (i.e. statistical copolymers), block copolymers or graft copolymers. In embodiments, the compounds(s) of formula (I) is/are not copolymers.

Textiles

The textile described herein, e.g. in relation to the first to third aspects of the invention, may be any textile, e.g. it may be formed of natural or artificial fibres. The textile may be weaved, knitted, crocheted, knotted, laced, braiding felted or bonded.

In some embodiments, the textiles or temperature regulating textile may form part of a textile article. Such textile articles may include apparel (e.g. sports/outdoor apparel) or bedding material (e.g. mattress ticking). In some embodiments, the textile articles include non-apparel articles, for example, bedding material, carpets, rugs, curtains, drapes or the like. In some embodiments, the textile article does not include apparel (e.g. sports/outdoor apparel).

The term "comprising" encompasses "including" as well as "consisting of" e.g. a composition "comprising" X may consist essentially of X or may consist exclusively of X, or may include something additional e.g. X+Y.

The term "about" in relation to a numerical value "x" is optional and may in embodiments mean "x plus or minus 10%".

Methods and Examples

The following examples are intended to illustrate aspects and embodiments of the invention and are not to be construed as being limitations thereon. Characterisation of the modified polyetheramines, intermediates and starting materials was performed by standard analytical methods e.g. melting points (m.p.) differential scanning calorimeter (DSC) etc.

Preparation of Compounds According to the Present Invention

The compounds of the present invention may be suitably synthesised according to conventional synthesis methods. An exemplary method of synthesising a compound of the present invention is provided below.

For the purpose of the methods described below, it will be understood that the Jeffamine® ED2003 compound is of the formula (p) wherein x+z is 6 and y is 39.

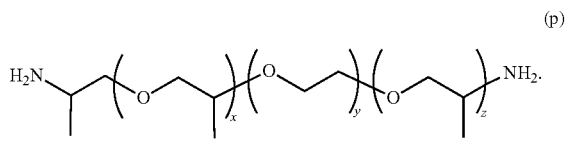

(p)

For the purposes of the methods described below, it will be understood that the Jeffamine® M2095 compound is of the formula:

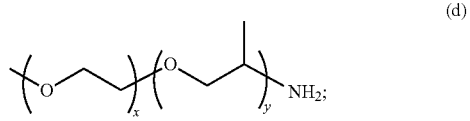

(d)

wherein the ratio of x to y is about 11:1 and the average molecular weight is about 2000.

Preparation of a Jeffamine® ED2003 Based Modified Compound According to the Present Invention.

1. Water 79 kg was added to a reaction vessel.
2. Jeffamine® ED2003 (17 kg) was then added to the vessel and mixed until the polymer was well-dispersed to form a polymer mixture.
3. The polymer mixture was then heated at a temperature of 50° C.
4. After reaching 50° C., 3-glycidyloxypropyltrimethoxysilane (4 kg) was added to the polymer mixture (Jeffamine® ED2003: 3-glycidyloxypropyltrimethoxysilane molar ratio is 1:2).
5. After addition of the 3-glycidyloxypropyltrimethoxysilane, the reaction mixture was stirred further at 50° C. for approximately 60 minutes whilst maintaining the viscosity of the mixture within the range of 30 cP to 100 cP.
6. A 500 g solution of 50% w/w citric was then added to the mixture to decrease the pH of the mixture to pH 6 or below.
7. The mixture was then stirred for a further 2 hours at 50° C.
8. A further 500 g solution of 50% w/w citric was then added to the mixture to decrease the pH of the mixture to pH 5 or below.
9. The reaction mixture was then cooled to room temperature to provide the modified polymer A solution The viscosity of the mixture was controlled during step 5 within the range 30-100 cP before adding citric acid.

Preparation of a Jeffamine® ED2003 and Jeffamine® M2095 Based Modified Compound According to the Present Invention.

A modified polymer B solution based on a mixture of Jeffamine® ED2003 and Jeffamine®

M2095 was then prepared using the method described above by replacing the Jeffamine® ED2003 with a mixture of Jeffamine® ED2003 and Jeffamine® M2095. The amounts of Jeffamine® ED2003, Jeffamine® M2095 and 3-glycidyloxypropyltrimethoxysilane were adjusted to 13.6 kg, 6.8 kg and 4.0 kg respectively.

Application of the Compounds of the Present Invention to a Textile Substrate

The modified polymer solutions of the present invention, prepared as described above, may be suitably applied to a textile substrate according to the exemplary methods provided below.

A modified polymer solution as described above, typically containing approximately 10% solids was applied to a textile substrate as follows:

1. A treatment bath containing 170 g/L of the modified polymer solution was prepared. The pH of the solution was checked and adjusted if necessary to approximately pH4.5.
2. A sample polyester (PES) fabric was dipped into the treatment bath until completely wetted out and was then immediately passed through rubber rollers of a padding machine to remove excess solution in order to achieve a wet pickup of the textile sample of approximately 85%.
3. The wet PES fabric was then dried by heating to 140° C. for 2-3 minutes to afford the treated textile samples.

Cooling Performance

The cooling performance of the pure polymers (i.e. Jeffamine® ED2003 and Jeffamine® M2095), modified polymers A and B, as well as the treated textile samples were then evaluated by measuring the enthalpy of fusion using a differential scanning calorimeter (DSC).

The temperature range of the measurement was −10° C. to +50° C., with a heating rate of 5° C./minute. Samples were loaded into sealed aluminium crucibles and placed in the DSC instrument and DSC thermograms produced. The enthalpy of fusion (in J/g) was then determined by integrating the area under the peak corresponding to the melting of the prepared modified polymers.

When measurements were made on the treated textile samples, the enthalpy of fusion (determined as J/g from integrating the area under the peak) was converted to $J/m^2$ by multiplying together the result in J/g and the weight per $m^2$ of the textile (measured in $g/m^2$).

TABLE 1

| | Melting point ° C. | Enthalpy of fusion (J/g) | Enthalpy of fusion (J/m²) |
|---|---|---|---|
| Jeffamine ® ED2003 (pure) | 42.1 | 121.4 | — |
| Jeffamine ® M2095 (pure) | 53.0 | 150.3 | — |
| Polymer A (dried from Polymer A solution) | 33.6 | 57.3 | — |
| Polymer B (dried from Polymer B solution) | 16.8 | 43.8 | — |
| Polymer A on PES textile (170 g/L) | 20.9 | 6.7 | 1098 |
| Polymer A on PES textile (170 g/L) - 5 washes | 17.1 | 2.8 | 457 |
| Polymer B on PES textile (170 g/L) | 24.1 | 7.0 | 1144 |
| Polymer B on PES textile (170 g/L) - 5 washes | 13.6 | 1.4 | 222 |

As can be seen from Table 1 above, on reaction with 3-glycidyloxypropyltrimethoxysilane, the enthalpy of the modified polymer (measured on a sample of dry solid from the reaction solution, Polymer A) falls to 57.3 J/g with a meting point of 33.6° C. as compared to Jeffamine® ED2003 (pure). On application of Polymer A (dried from solution) to a PES textile sample, the enthalpy of fusion was measured at 6.7 J/g of the fabric equivalent to 1098 $J/m^2$ (Fabric weight was 163 $g/m^2$).

The enthalpy of fusion measured on the fabric is perceived as a cooling effect when in contact with the skin. The melting of the polymer at the surface absorbs heat from the skin at the temperature of the melting point. The change of state from solid to liquid requires considerably more energy (heat) than that required to heat the substance without a change in state.

After washing, approximately 42% of the enthalpy is retained for Polymer A and 24% for Polymer B. In both cases there remains a significant coolness of the fabric after washing.

Moisture Management Performance

Modified polymer solution A containing a modified polymer formed from Jeffamine® ED2003 and 3-glycidyloxypropyltrimethoxysilane as described under the section headed "Preparation of compounds according to the present invention" was used for the moisture management performance tests. This modified polymer solution A was generally applied to a textile substrate together with an anti-phenolic yellowing agent (Mikra ST also available from Rudolf Chemie, known as Rucolan VGI) as follows:

1. A treatment bath containing a defined amount (g/L) of the modified polymer solution A, water and Mikra ST was prepared. The pH of the solution was checked and adjusted if necessary to approximately pH 4.5.
2. A sample textile was dipped into the treatment bath until completely wetted out and was then immediately passed through rubber rollers of a padding machine to remove excess solution in order to achieve a certain wet pickup of the wet textile sample.
3. The wet textile samples were then dried by heating to 140° C. for 2-3 minutes to afford the treated textile samples. These treated textile samples were then used to perform the moisture management performance tests as detailed below.

Examples of treated textile samples produced in accordance with the procedure provided above are detailed in the Table 2. Table 2 details the types of textile material, the quantities of modified polymer solution A, water and Mikra ST used to produce the treated textile samples. Wet pickup values achieved for each wet textile sample before obtaining the corresponding treated textile sample are also shown.

TABLE 2

| Treated Textile Sample | Textile Type | Amount of Modified Polymer Solution A used | Amount of Water used | Amount of Mikra ST used | Wet pick-up |
|---|---|---|---|---|---|
| 1 | Decca, knitted, polyester, white colour, 146 g/m² | 200 g/L | 760 g/L | 40 g/L | 90-100% |
| 2 | Decca, knitted, polyester, white colour, 146 g/m² | 300 g/L | 660 g/L | 40 g/L | 90-100% |
| 3 | Decca, knitted, polyester, | 600 g/L | 360 g/L | 40 g/L | 90-100% |

TABLE 2-continued

| Treated Textile Sample | Textile Type | Amount of Modified Polymer Solution A used | Amount of Water used | Amount of Mikra ST used | Wet pick-up |
|---|---|---|---|---|---|
| | white colour, 146 g/m² | | | | |
| 4 | Woven, 78% cotton/ 22% polyester, green colour, 115 g/m² | 300 g/L | 660 g/L | 40 g/L | 65% |
| 5 | Woven, 78% cotton/ 22% polyester, green colour, 115 g/m² | 50 g/L | 943 g/L | 7 g/L | 68% |
| 6 | Woven, 100% cotton, green colour, 125 g/m² | 300 g/L | 660 g/L | 40 g/L | 65% |
| 7 | Woven, 100% cotton, green colour, 125 g/m² | 50 g/L | 943 g/L | 7 g/L | 75% |

The moisture management performance tests were then performed on the following treated textiles samples 1-7 as described below.

Enthalpy of Fusion Data

TABLE 3

| Textile Sample | Enthalpy of fusion (J/m²) |
|---|---|
| Treated Textile Sample 1 | 243 |
| Treated Textile Sample 2 | 517 |
| Treated Textile Sample 3 | 689 |

As described above in relation for the data provided above in Table 1 when measurements were made on the treated textile samples, the enthalpy of fusion (determined as J/g from integrating the area under the peak) was converted to J/m² by multiplying together the result in J/g and the weight per m² of the textile (measured in g/m²).

Evaporation Rate Data

Evaporation rate test data was determined according to the procedure detailed below.

1. A treated textile sample was cut to size and laid flat inside a petri dish.
2. The petri dish containing the textile sample was then accurately weighed using a balance.
3. Approximately 1 ml of distilled water was then added onto the textile sample and the petri dish weighed again.
4. The petri dish was then weighed again at five minute intervals up until 30 minutes.
5. The amount of water evaporated from the fabric (i.e. water loss % or evaporation rate %) at each time interval are then be calculated as shown by the workings below:
6. All weight measurements were carried out at approximately 25° C.+/−0.5° C.

Weight of petri dish+textile sample: 25.7911 g
Weight of petri dish+textile sample+distilled water: 26.8580 g
Weight after 30 minutes: 26.3818 g
Total amount of distilled water added onto the textile sample: 1.0669 g
Water evaporated after 30 minutes: 0.4762 g
Water evaporated after 30 minutes: 26.8580−26.3818=0.4762 g
Initial amount of water added to the fabric: 26.8580−25.7911=1.0669 g
% evaporation rate after 30 minutes:

$$\frac{0.4762}{1.0669} \times 100 = 44.6\%$$

Evaporation rate tests were performed on treated textile samples 1-7 (unwashed and washed) and the results are provided in Table 4 below.

TABLE 4

| Textile Sample | Water loss (%) after 30 min (unwashed) | Water loss (%) after 30 min (washed) |
|---|---|---|
| Treated Textile Sample 1 | 31 | 34 |
| Treated Textile Sample 2 | 30 | 32 |
| Treated Textile Sample 3 | 23 | 28 |
| Treated Textile Sample 4 | 39 | 38 |
| Treated Textile Sample 5 | 43 | 46 |
| Treated Textile Sample 6 | 41 | 38 |
| Treated Textile Sample 7 | 43 | 47 |
| Untreated Textile Sample (Decca, knitted, polyester, white colour, 146 g/m²) | 15 | 17 |
| Untreated Textile Sample (Woven, 78% cotton/22% polyester, green colour, 115 g/m²) | 40 | 40 |
| Untreated Textile Sample (Woven, 100% cotton, green colour, 125 g/m²) | 39 | 40 |

Absorbency Data

Absorbency data was obtained according to the procedure detailed below.

1. A treated textile sample was cut to size and laid flat inside a petri dish.
2. A drop of distilled water was placed on the surface of the textile sample.
3. The time required for the water drop to be completely absorbed (i.e. the droplet disappears into the surface of the textile) was observed visually and recorded.

Treated textiles samples 4-7 were all tested using the procedure detailed above and all demonstrated absorbency measurements of 1 second or less.

Wicking Data

Wicking data was obtained according to the procedure detailed below.
1. A treated textile sample was cut measuring 20 cm×4 cm in the Warp direction (along the longitudinal warp yarns).
2. A line was then marked 0.5 cm from one end of the cut treated textile sample to be used as the starting point for the test measurement.
3. The cut treated textile sample was then suspended from a retort stand.
4. A petri dish filled with distilled water was then placed on a lab jack and the petri dish elevated until the marked line on the cut treated textile sample is level with the surface of the water.
5. At the end of a specified period of time (i.e. 3 minutes or 30 minutes) the cut treated textile sample was then removed and the distance travelled by the water from the marked line was measured.

Wicking tests were performed on treated textile samples 1-7 (unwashed and washed) and the results are provided in Table 5 below.

| Textile Sample | Wicking measurement Warp (unwashed) | Wicking measurement Warp (washed) |
| --- | --- | --- |
| Treated Textile Sample 1 | 13.3 cm after 30 min | 15.9 cm after 30 min |
| Treated Textile Sample 2 | 12.7 cm after 30 min | 16.2 cm after 30 min |
| Treated Textile Sample 3 | 10.9 cm after 30 min | 14.3 cm after 30 min |
| Untreated Textile Sample (Decca, knitted, polyester, white colour, 146 g/m²) | 4.8 cm after 30 min | 2.2 cm after 30 min |

The statements of invention recited in the following numbered clauses are also included in the present disclosure:

Clause 1. Use of a compound according to formula (I) for imparting a temperature regulating effect to a textile:

wherein:
A is a polymer;
B is selected from the group consisting of —NHR$_1$, —OH, —SH, —NR$_1$-L$_1$-X, —O-L$_1$-X and —S-L$_1$-X wherein:
R$_1$ is H or optionally substituted —C$_{1-6}$alkyl;
L$_1$ is a linker with a chain length having an integer from 1 to 10 atoms;
X comprises an electrophilic moiety capable of accepting electrons from a nucleophile to form a covalent bond;
r is an integer from 1 to 3 and
wherein the melting point of the compound is from about 5° C. to about 55° C. and the use comprises forming a covalent bond between B and the textile.

Clause 2. The use according to clause 1, wherein A is a polyether.

Clause 3. The use according to clause 1 or 2, wherein L$_1$ is an optionally substituted —C$_{1-6}$alkylene or —R$_2$OR$_3$— wherein R$_2$ and R$_3$ are optionally substituted —C$_{1-6}$alkylene.

Clause 4. The use according to clause 3 wherein L$_1$ is selected from:

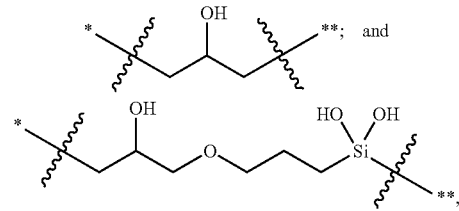

wherein (*) denotes the point of attachment to N, O or S and (**) denotes the point of attachment to X.

Clause 5. The use according to any one of the preceding clauses wherein X is a halogen or OH, preferably wherein X is Cl or OH.

Clause 6. The use according to any one of clauses 1-4 wherein the X comprises the electrophilic moiety in the form of an epoxide group.

Clause 7. The use according to any one of the preceding clauses wherein —NR$_1$-L$_1$—X is selected from:

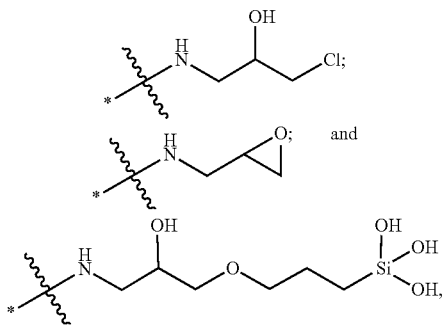

wherein (*) denotes the point of attachment to A.

Clause 8. The use according to any one of clauses 2-7, wherein the polyether is of the formula (II):

wherein:
E is selected from

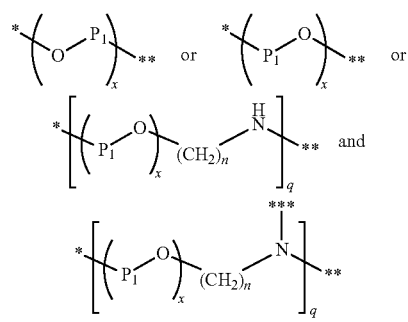

or E is absent, wherein (*) denotes the point of attachment to R$_4$, () denotes the point of attachment to F, G, D or B as appropriate and (*) denote the point of attachment to another separately independent F, G, D or B as appropriate;

F is selected from

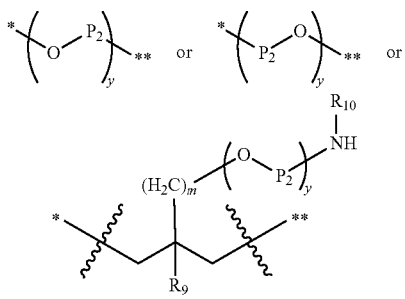

or F is absent, wherein (*) denotes the point of attachment to E or $R_4$ as appropriate and (**) denotes the point of attachment to G, D or B as appropriate;

G is selected from

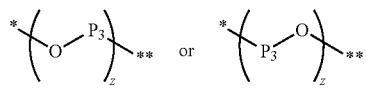

or G is absent, wherein (*) denotes the point of attachment to E, F or $R_4$ as appropriate and (**) denotes the point of attachment to D or B as appropriate;

wherein:
$P_1$, $P_2$ and $P_3$ are each independently selected from optionally substituted —$C_{1-6}$alkylene, optionally substituted —$C_{2-6}$heteroalkylene, optionally substituted —$C_{3-6}$cycloalkylene, optionally substituted —$C_{3-6}$heterocycloalkylene, optionally substituted —$C_{2-6}$alkenylene, optionally substituted —$C_{2-6}$heteroalkenylene, optionally substituted —$C_{3-6}$cycloalkenylene, optionally substituted —$C_{3-6}$heterocycloalkenylene, optionally substituted —$C_{2-6}$alkynylene, optionally substituted —$C_{2-6}$heteroalkynylene, optionally substituted —$C_{6-14}$arylene or optionally substituted —$C_{5-14}$heteroarylene, optionally substituted —C(=O)$C_{1-20}$alkylene, optionally substituted —$CO_2C_{1-20}$alkylene, optionally substituted —C(=O)NH$C_{1-20}$alkylene;

x, y and z are each a positive integer or zero and the of sum of x+y+z is from about 2 to about 100;

q is integer from 0 to 5;

m and n are each independently integers from 1 to 5;

$R_4$ is selected independently from optionally substituted —$C_{1-20}$alkyl, optionally substituted —$C_{2-20}$heteroalkyl, optionally substituted —$C_{3-6}$cycloalkyl, optionally substituted —$C_{3-6}$heterocycloalkyl, optionally substituted —$C_{2-6}$alkenyl, optionally substituted —$C_{2-6}$heteroalkenyl, optionally substituted —$C_{3-6}$cycloalkenyl, optionally substituted —$C_{3-6}$heterocycloalkenyl, optionally substituted —$C_{2-6}$alkynyl, optionally substituted —$C_{2-6}$heteroalkynyl, optionally substituted —$C_{6-14}$aryl or optionally substituted —$C_{5-14}$heteroaryl, optionally substituted —C(=O)$C_{1-20}$alkyl, optionally substituted —$CO_2C_{1-20}$alkyl, optionally substituted —C(=O)NH$C_{1-20}$alkyl, —$R_5NHR_6$, —$R_5OH$, —$R_5SH$, —$R_5NR_6$-$L_2$-X, —$R_{50}$-$L_2$-X, —$R_5$—S-$L_2$-X, —$NHR_6$, —$NR_6$-$L_2$-X or -$L_2$-X wherein:

$R_5$ is optionally substituted —$C_{1-6}$alkylene;
$R_6$ is optionally substituted —$C_{1-6}$alkylene, optionally substituted —$C_{1-6}$alkyl or H;
$R_9$ is optionally substituted —$C_{1-6}$alkyl;
$R_{10}$ is optionally substituted —$C_{1-6}$alkyl or H;
$L_2$ is a linker with a chain length having an integer from 1 to 10 atoms;
X comprises an electrophilic moiety capable of accepting electrons from a nucleophile to form a covalent bond; and
D is an optionally substituted —$C_{1-6}$alkylene or absent;
(***) denotes the point of attachment to B.

Clause 9. The use according to clause 8, wherein when $R_4$, E, F, G and D are taken together the polyether is of the formula (III):

wherein:
$P_1$, $P_2$ and $P_3$ are each independently selected from optionally substituted —$C_{1-6}$alkylene, optionally substituted —$C_{2-6}$heteroalkylene, optionally substituted —$C_{3-6}$cycloalkylene, optionally substituted —$C_{3-6}$heterocycloalkylene, optionally substituted —$C_{2-6}$alkenylene, optionally substituted —$C_{2-6}$heteroalkenylene, optionally substituted —$C_{3-6}$cycloalkenylene, optionally substituted —$C_{3-6}$heterocycloalkenylene, optionally substituted —$C_{2-6}$alkynylene, optionally substituted —$C_{2-6}$heteroalkynylene, optionally substituted —$C_{6-14}$arylene or optionally substituted —$C_{5-14}$heteroarylene, optionally substituted —C(=O)$C_{1-20}$alkylene, optionally substituted —$CO_2C_{1-20}$alkylene, optionally substituted —C(=O)NH$C_{1-20}$alkylene;

x, y and z are each a positive integer or zero and the of sum of x+y+z is from about 2 to about 100;

$R_4$ may be selected independently from optionally substituted —$C_{1-20}$alkyl, optionally substituted —$C_{2-20}$heteroalkyl, optionally substituted —$C_{3-6}$cycloalkyl, optionally substituted —$C_{3-6}$heterocycloalkyl, optionally substituted —$C_{2-6}$alkenyl, optionally substituted —$C_{2-6}$heteroalkenyl, optionally substituted —$C_{3-6}$cycloalkenyl, optionally substituted —$C_{3-6}$heterocycloalkenyl, optionally substituted —$C_{2-6}$alkynyl, optionally substituted —$C_{2-6}$heteroalkynyl, optionally substituted —$C_{6-14}$aryl or optionally substituted —$C_{5-14}$heteroaryl, optionally substituted —C(=O)$C_{1-20}$alkyl, optionally substituted —$CO_2C_{1-20}$alkyl, optionally substituted —C(=O)NH$C_{1-20}$alkyl, —$R_5NHR_6$, —$R_5OH$, —$R_5SH$, —$R_5NR_6$-$L_2$-X, —$R_{50}$-$L_2$-X, —$R_5$—S-$L_2$-X, —$NHR_6$, —$NR_6$-$L_2$-X or -$L_2$-X wherein:

$R_5$ is optionally substituted —$C_{1-6}$alkylene;
$R_6$ is optionally substituted —$C_{1-6}$alkylene, optionally substituted —$C_{1-6}$alkyl or H;
$L_2$ is a linker with a chain length having an integer from 1 to 10 atoms;
when taken together -X comprises an electrophilic moiety capable of accepting electrons from a nucleophile to form a covalent bond;
D is an optionally substituted —$C_{1-6}$alkylene or absent; and
(*) denotes the point of attachment to B.

Clause 10. The use according to clause 8 or 9, wherein $L_2$ is an optionally substituted —$C_{1-6}$alkylene or —$R_7OR_8$— wherein $R_7$ and $R_8$ are optionally substituted —$C_{1-6}$alkylene.

Clause 11. The use according to any one of clauses 8 to 10 wherein $L_2$ is selected from:

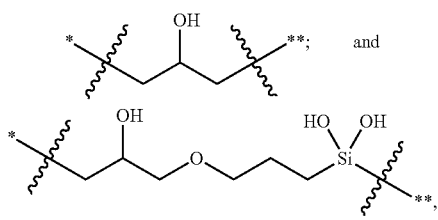

wherein (*) denotes the point of attachment to N, O or S and (**) denotes the point of attachment to X.

Clause 12. The use according to any one of clauses 8 to 11 wherein X is a halogen or —OH, preferably wherein X is Cl or —OH.

Clause 13. The use according to any one of clauses 8 to 10 wherein the X comprises the electrophilic moiety in the form of an epoxide group.

Clause 14. The use according to any one of clauses 8 to 10 wherein —$R_5NR_6$-$L_2$-X— is selected from:

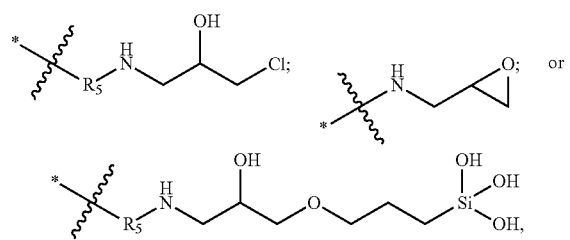

wherein (*) denotes the point of attachment to the polyether of formula (II) or (III).

Clause 15. The use according to any one of clauses 8 to 14, wherein $P_1$, $P_2$ and $P_3$ are each independently optionally substituted —$C_{1-6}$alkylene.

Clause 16. The use according to clause 15, wherein $P_1$, $P_2$ and $P_3$ are each independently selected from optionally substituted —$CH_2CH_2$—, —$CH_2CH(CH_3)$—, —$CH(CH_3)CH_2$— or —$CH_2CH_2CH_2CH_2$—.

Clause 17. The use according to clause 16, wherein the polyether of formula (III) is

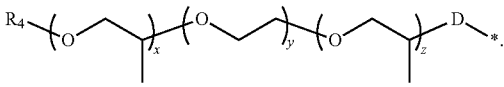

Clause 18. The use according to clause 17 wherein $R_4$ is selected from —$R_5NHR_6$, —$R_5NR_6$-$L_2$-X, —$NHR_6$ or —$NR_6$-$L_2$-X and B is selected from —$NHR_1$ and —$NR_1$-$L_1$-X.

Clause 19. The use according to clause 18, wherein the $R_4$ is —$R_5NHR_6$ or —$R_5NR_6$—$L_2$-X.

Clause 20. The use according to any one of clauses 17 to 19 where x+z is from 2 to 20 and y is from 30 to 50.

Clause 21. The use according to clause 20, wherein x+z is from 5 to 15 and y is from 35 to 45.

Clause 22. The use according to clause 21, wherein the compound of formula (I) is

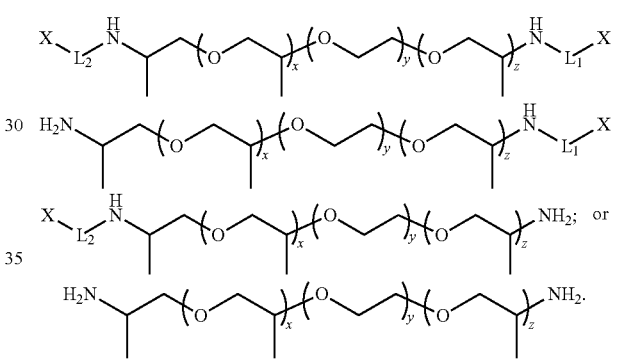

Clause 23. The use according to clause 22, wherein the compound according to formula (I) is

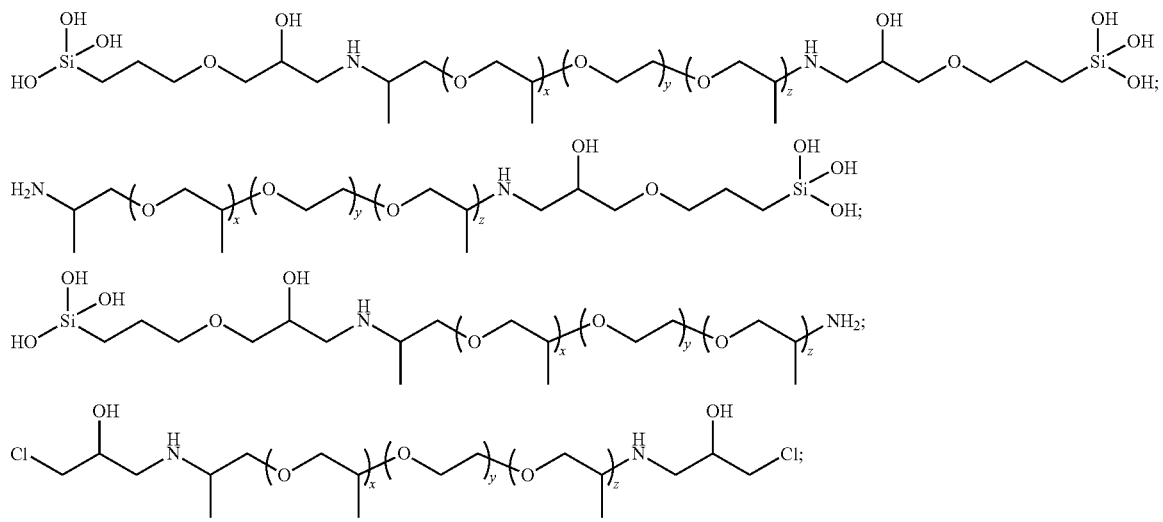

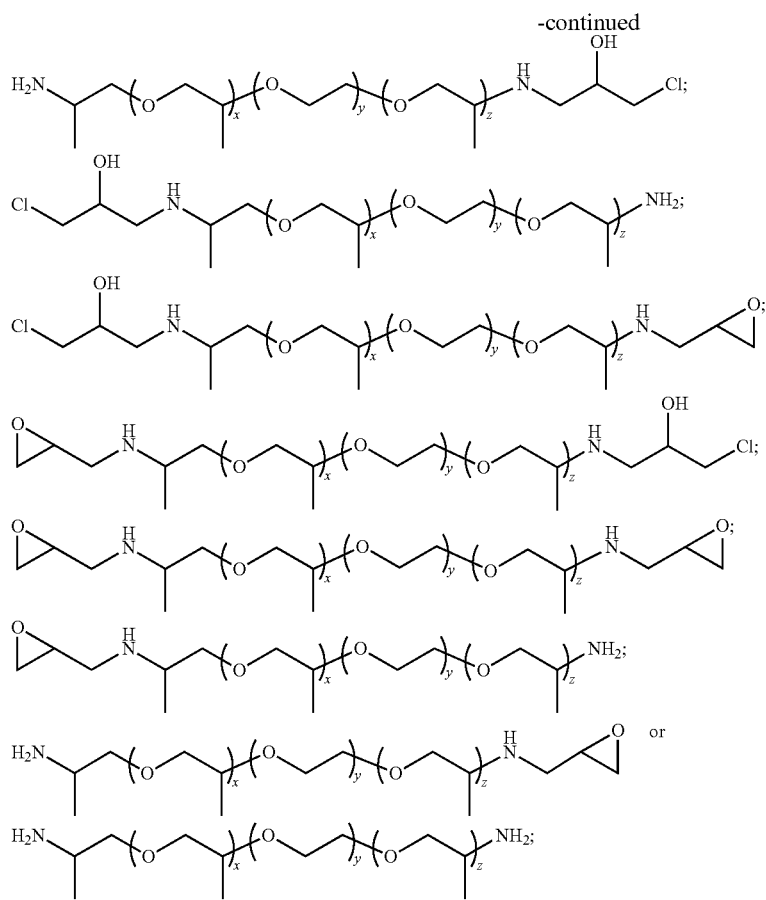

wherein x+z is from 5 to 10 and y is from 35 to 45, preferably wherein x+z is 6 and y is 39.

Clause 24. The use according to clause 8, wherein when $R_4$, E, F, G and D are taken together the polyether is of the formula (IVa) or (IVb):

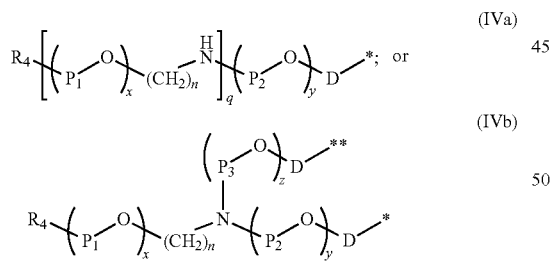

wherein:
x, y, and z are each independently selected from an integer of from 5 to 20;
n is 4;
q is 0 to 2, optionally 1 to 2; and
D is an optionally substituted —$C_1$calkylene; and
wherein (*) denotes the point of attachment to B and (**) denotes the point of attachment to another separately independent B.

Clause 25. The use according to clause 24 wherein $R_4$ is selected from —$NHR_6$ or —$NR_6$-$L_2$-X and B is selected from —$NHR_1$ and —$NR_1$-$L_1$-X.

Clause 26. The use according to clause 25, wherein the compound of formula (I) is

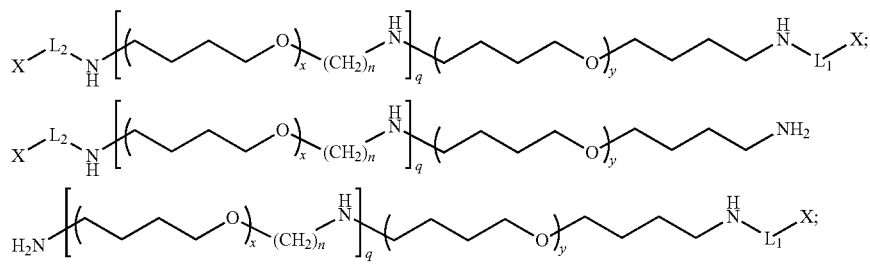

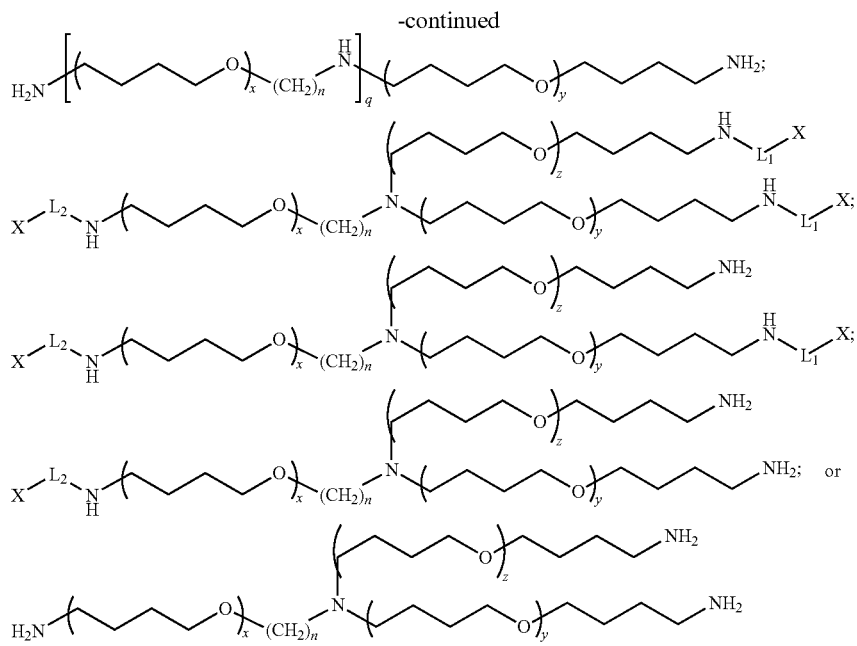

wherein the —NH-L$_1$-X and —NH-L$_2$-X are independently selected from

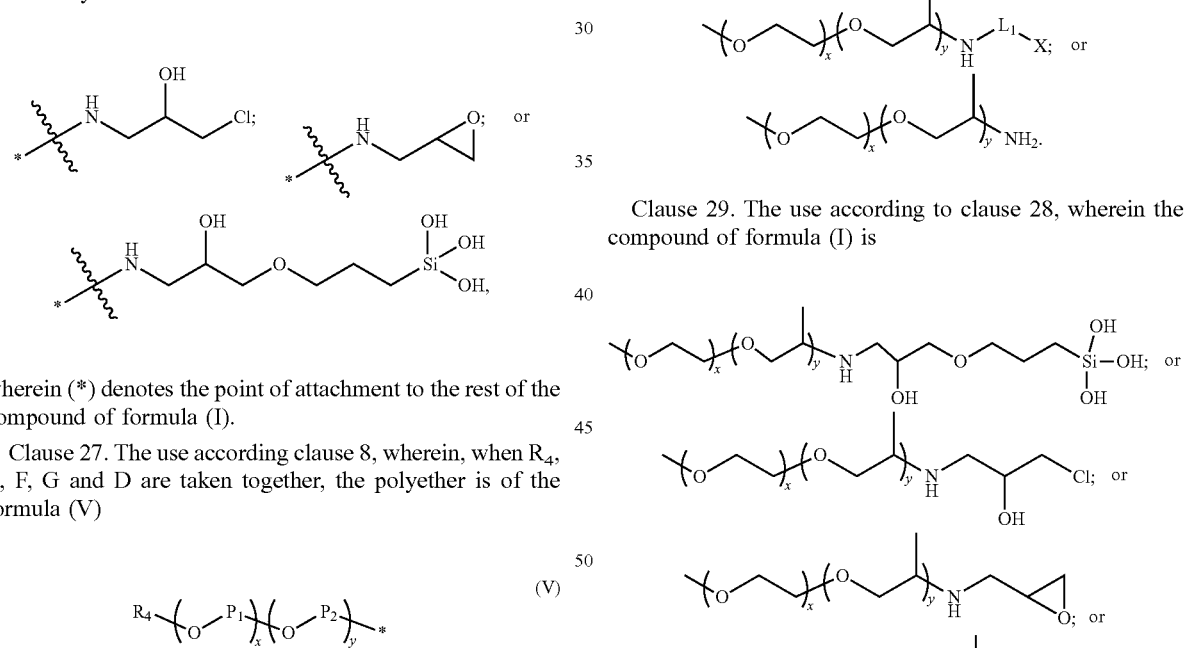

wherein (*) denotes the point of attachment to the rest of the compound of formula (I).

Clause 27. The use according clause 8, wherein, when R$_4$, E, F, G and D are taken together, the polyether is of the formula (V)

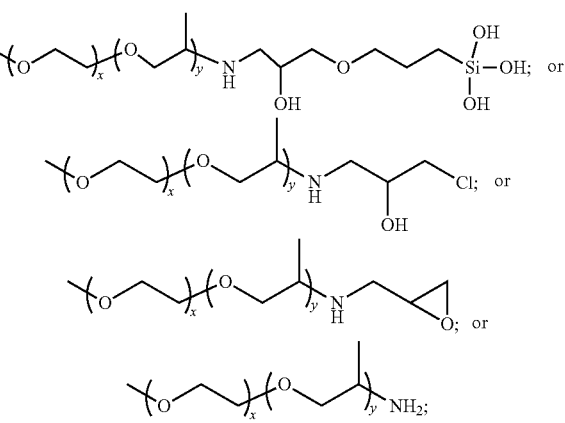

wherein:

P$_1$ and P$_2$ are each independently selected from optionally substituted —C$_{1-4}$ alkylene;

z=0;

R$_4$ is selected independently from optionally substituted —C$_{1-20}$alkyl;

D is absent; and (*) denotes the point of attachment to B.

Clause 28. The use according to clause 27, wherein the compound of formula (I) is Clause 29. The use according to clause 28, wherein the compound of formula (I) is wherein the ratio of x to y is from about 1:20 to about 20:1

Clause 30. The use according to clause 29, wherein the ratio of x to y is about 11:1 and the average molecular weight is about 2000.

Clause 31. The use according to any one of clauses 1 to 30 wherein the compound according to formula (I) has an average molecular weight of from about 100 to about 6000, from about 1000 to about 4000, from about 1500 to about 3500, from about 1700 to about 3000, from about 1700 to about 2500, from about 2000 to about 2500.

Clause 32. The use according to any one of the preceding clauses, wherein the melting point of the compound is from about 20° C. to about 45° C., from about 15° C. to about 35° C. or from about 20° C. to about 35° C.

Clause 33. The use according to any one of the preceding clauses wherein the enthalpy of fusion is from about 10 J/g to about 200 J/g or from about 40 J/g to about 150 J/g.

Clause 34. A method of manufacturing a temperature regulating textile comprising:
applying a compound of formula (I) to a textile and forming a covalent bond between the compound and the textile to provide the temperature regulating textile;

$$A\text{---}(B)_r;\quad (I)$$

wherein:
A is a polymer;
B is selected from the group consisting of —NHR$_1$, —OH, —SH, —NR$_1$-L$_1$-X, —O-L$_1$-X and —S-L$_1$-X wherein:
R$_1$ is H or optionally substituted —C$_{1-6}$alkyl;
L$_1$ is a linker with a chain length having an integer from 1 to 10 atoms;
X comprises an electrophilic moiety capable of accepting electrons from a nucleophile to form a covalent bond;
r is an integer from 1 to 3 and
wherein the melting point of the compound is from about 5° C. to about 55° C.;
and wherein, when B is selected from the group consisting of —NR$_1$-L$_1$-X, —O-L$_1$-X and —S-L$_1$-X, the forming a covalent bond between the compound and the textile comprises forming a covalent bond between the electrophilic moiety capable of accepting electrons from a nucleophile and a nucleophilic group on the textile; and, when B is selected from the group consisting of —NHR$_1$, —OH and —SH, the forming a covalent bond between the compound and the textile comprises forming a covalent bond between B and an electrophilic moiety on the textile;

provided that the compound of the formula (I) is not a compound according to any of formulae (VI) to (IX) defined below:

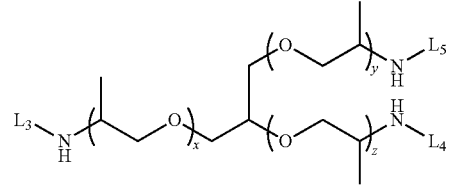

(VI)

wherein x, y and z are each a positive integer or zero and x+y+z is from about 35 to about 65, preferably from about 45 to about 55;

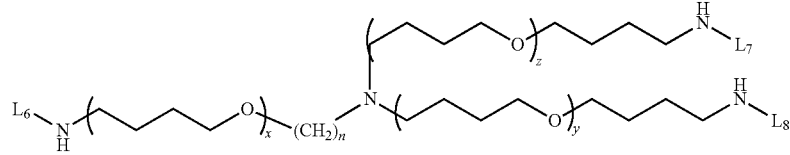

(VII)

wherein x, y, and z are positive integers and independently selected from about 5 to about 20; and n is 4;

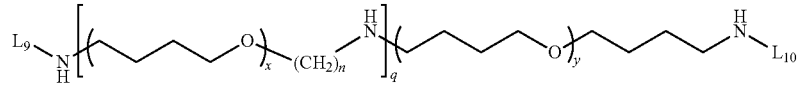

(VIII)

wherein x, y, and z are positive integers and independently selected from about 5 to about 20; n is 4; and q is 0 to 2, optionally 1 to 2;
and

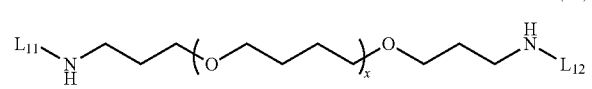

(IX)

wherein x is a positive integer from about 10 to about 50, preferably from about 25 to about 35;
wherein L$_3$, L$_4$, L$_5$, L$_6$, L$_7$, L$_8$, L$_9$, L$_{10}$, L$_{11}$, and L$_{12}$ are each independently selected from H;

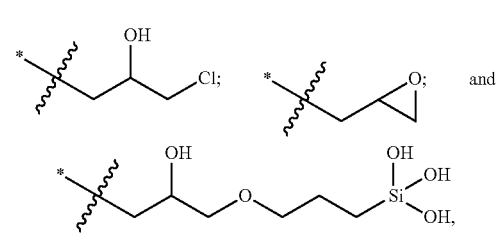

and (*) denotes the point of attachment to —NH.

Clause 35. The method of manufacturing a temperature regulating textile according to clause 34, wherein the electrophilic moiety on the textile is selected from

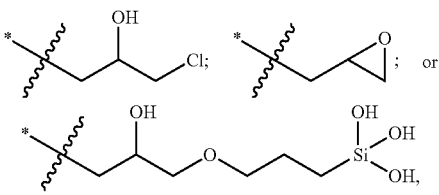

wherein (*) denotes the point of attachment to the textile.

Clause 36. The method of manufacturing a temperature regulating textile according to clause 34 or 35, wherein the polymer is a polyether of the formula (III):

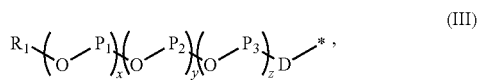

wherein:

P$_1$, P$_2$ and P$_3$ are each independently selected from optionally substituted —C$_{1-6}$alkylene, optionally substituted —C$_{2-6}$heteroalkylene, optionally substituted —C$_{3-6}$cycloalkylene, substituted optionally —C$_{3-6}$heterocycloalkylene, optionally substituted —C$_{2-6}$alkenylene, optionally substituted —C$_{2-6}$heteroalkenylene, optionally substituted —C$_{3-6}$cycloalkenylene, optionally substituted —C$_{3-6}$heterocycloalkenylene, optionally substituted —C$_{2-6}$alkynylene, optionally substituted —C$_{2-6}$heteroalkynylene, optionally substituted —C$_{6-14}$arylene or optionally substituted —C$_{5-14}$heteroarylene, optionally substituted —C(=O)C$_{1-20}$alkylene, optionally substituted —CO$_2$C$_{1-20}$alkylene, optionally substituted —C(=O)NHC$_{1-20}$alkylene;

x, y and z are each independently positive integers or zero and the of sum of x+y+z is from about 2 to about 100;

R$_4$ may be selected independently from optionally substituted —C$_{1-20}$alkyl, optionally substituted —C$_{2-20}$heteroalkyl, optionally substituted —C$_{3-6}$cycloalkyl, optionally substituted —C$_{3-6}$heterocycloalkyl, optionally substituted —C$_{2-6}$alkenyl, optionally substituted —C$_{2-6}$heteroalkenyl, optionally substituted —C$_{3-6}$cycloalkenyl, optionally substituted —C$_{3-6}$heterocycloalkenyl, optionally substituted —C$_{2-6}$alkynyl, optionally substituted —C$_{2-6}$heteroalkynyl, optionally substituted —C$_{6-14}$aryl or optionally substituted —C$_{5-14}$heteroaryl, optionally substituted —C(=O)C$_{1-20}$alkyl, optionally substituted —CO$_2$C$_{1-20}$alkyl, optionally substituted —C(=O)NHC$_{1-20}$alkyl, —R$_5$NHR$_6$, —R$_5$OH, —R$_5$SH, —R$_5$NR$_6$-L$_2$-X, —R$_5$O-L$_2$-X, —R$_5$—S-L$_2$-X, —NHR$_6$, —NR$_6$-L$_2$-X or -L$_2$-X wherein:

R$_5$ is optionally substituted —C$_{1-6}$alkylene;

R$_6$ is optionally substituted —C$_{1-6}$alkylene, optionally substituted —C$_{1-6}$alkyl or H;

L$_2$ is a linker with a chain length having an integer from 1 to 10 atoms;

when taken together X comprises an electrophilic moiety capable of accepting electrons from a nucleophile to form a covalent bond;

D is an optionally substituted —C$_{1-6}$alkylene or absent; and (*) denotes the point of attachment to B.

Clause 37. The method of manufacturing a temperature regulating textile according to any one of clauses 34 to 36, wherein L$_2$ is an optionally substituted —C$_{1-6}$alkylene or —R$_7$OR$_8$— wherein R$_7$ and Ra are optionally substituted —C$_{1-6}$alkylene.

Clause 38. The method of manufacturing a temperature regulating textile according to any one of clauses 34 to 37 wherein L$_2$ is selected from:

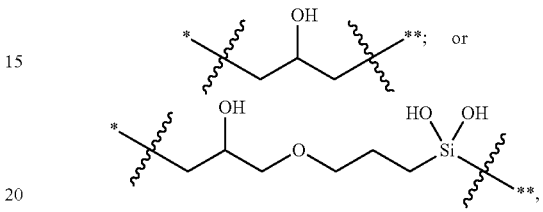

wherein (*) denotes the point of attachment to N, O or S and (**) denotes the point of attachment to X.

Clause 39. The method of manufacturing a temperature regulating textile according to any one of clauses 34 to 38 wherein X is a halogen or —OH, preferably wherein X is Cl or —OH.

Clause 40. The method of manufacturing a temperature regulating textile according to any one of clauses 34 to 39 wherein the X comprises the electrophilic moiety in the form of an epoxide group.

Clause 41. The method of manufacturing a temperature regulating textile according to any one of clauses 34 to 40 wherein —R$_5$NR$_6$-L$_2$-X— is selected from:

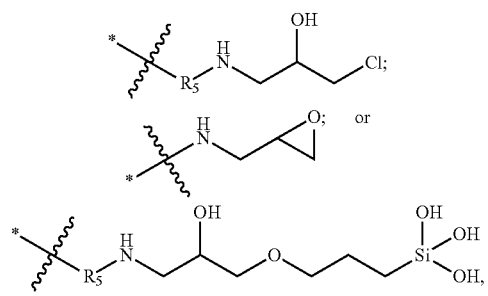

wherein (*) denotes the point of attachment to the polyether of formula (II) or (III).

Clause 42. The method of manufacturing a temperature regulating textile according to any one of clauses 34 to 41, wherein P$_1$, P$_2$ and P$_3$ are each independently optionally substituted —C$_{1-6}$alkylene.

Clause 43. The method of manufacturing a temperature regulating textile according to clause 42, wherein P$_1$, P$_2$ and P$_3$ are each independently selected from optionally substituted —CH$_2$CH$_2$—, —CH$_2$CH(CH$_3$)—, —CH(CH$_3$)CH$_2$— or —CH$_2$CH$_2$CH$_2$CH$_2$—.

Clause 44. The method of manufacturing a temperature regulating textile according to clause 34 to 43, wherein the polyether of formula (III) is

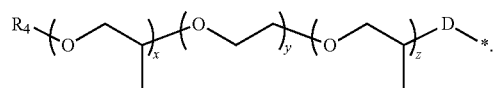

Clause 45. The method of manufacturing a temperature regulating textile according to clause 44 wherein $R_4$ is selected from $-R_5NHR_6$, $-R_5NR_6-L_2-X$, $-NHR_6$ or $-NR_6-L_2-X$ and B is selected from $-NHR_1$ and $-NR_1-L_1-X$.

Clause 46. The method of manufacturing a temperature regulating textile according to clause 45, wherein the $R_4$ is $-R_5NHR_6$ or $-R_5NR_6-L_2-X$.

Clause 47. The method of manufacturing a temperature regulating textile according to any one of clauses 44 to 46 where x+y is from 2 to 20 and y is from 30 to 50.

Clause 48. The method of manufacturing a temperature regulating textile according to clause 47, wherein x+z is from 5 to 15 and y is from 35 to 45.

Clause 49. The method of manufacturing a temperature regulating textile according to any of clauses 44 to 48, wherein the compound of formula (I) is

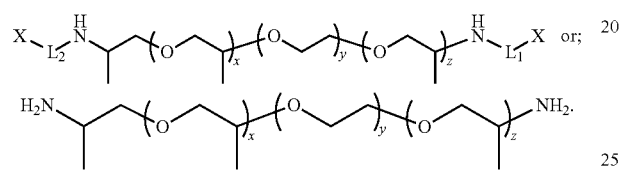

Clause 50. The method of manufacturing a temperature regulating textile according to clause 49, wherein the compound according to formula (I) is

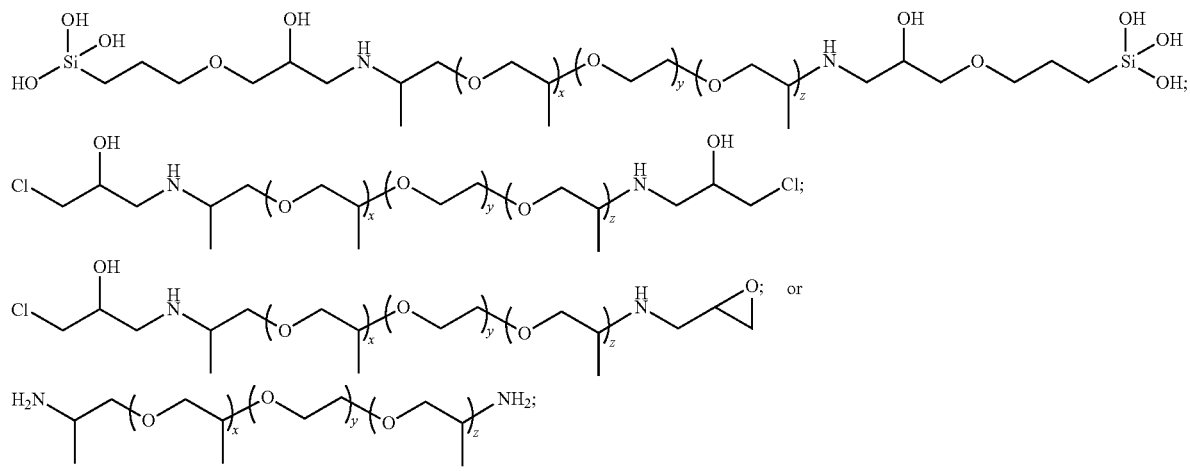

wherein x +z is from 5 to 10 and y is from 35 to 45, preferably wherein x+z is 6 and y is 39.

Clause 51. The method of manufacturing a temperature regulating textile according to clause 34 wherein the polyether is of the formula (V)

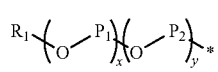

wherein:

$P_1$ and $P_2$ are each independently selected from optionally substituted $-C_{1-6}$ alkylene;

z=0;

$R_4$ is selected independently from optionally substituted $-C_{1-20}$alkyl;

D is absent; and (*) denotes the point of attachment to B.

Clause 52. The method according to clause 51, wherein the compound of formula (I) is

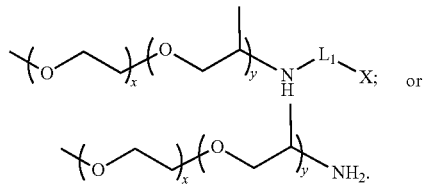

Clause 53. The method according to clause 52, wherein the compound of formula (I) is

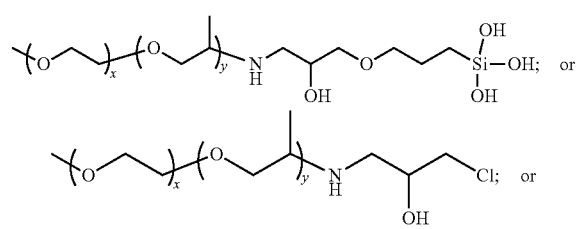

-continued

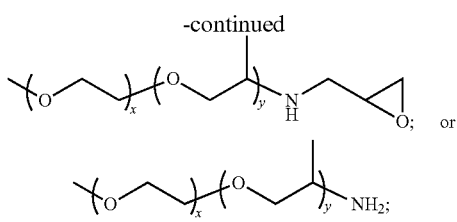

wherein the ratio of x to y is from about 1:20 to about 20:1.

Clause 54. The method according to clause 53, wherein the ration of x to y is about 11:1 and the average molecular weight is from about 1700 to about 2500, e.g. about 2000.

Clause 55. A compound selected from the following:

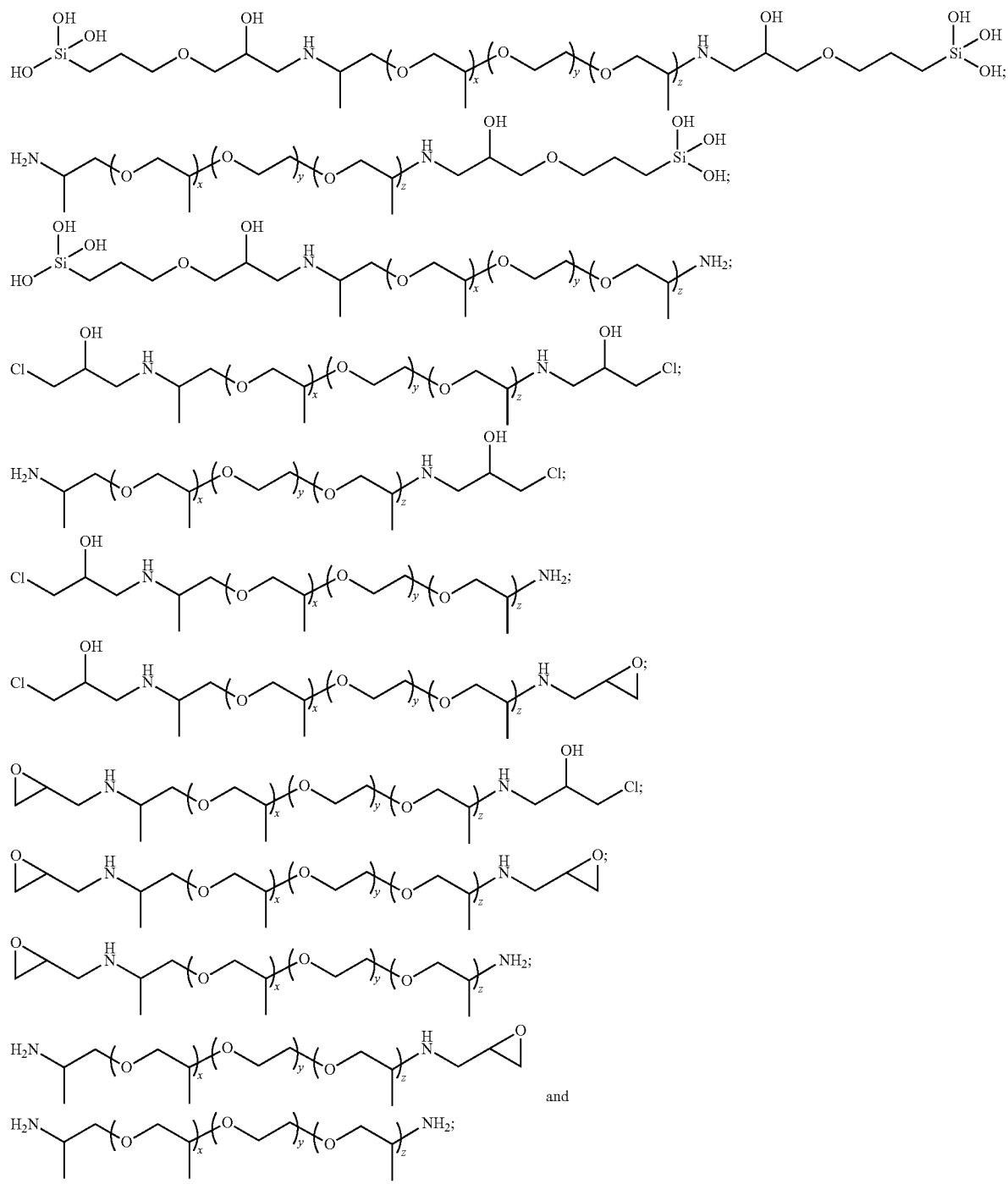
wherein x+z is from 5 to 10 and y is from 35 to 45, preferably wherein x+z is 6 and y is 39.
Clause 56. A compound selected from the following:
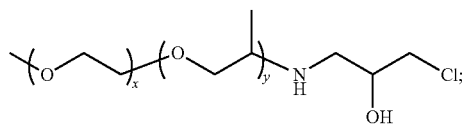
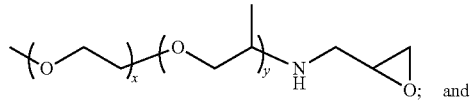
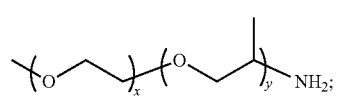

wherein the ratio of x to y is about 11:1 and the average molecular weight is from about 1700 to about 2500, e.g. about 2000.

The described and illustrated embodiments herein are to be considered as illustrative and not restrictive in character, it being understood that only the preferred embodiments have been shown and described and that all changes and modifications that come within the scope of the invention as defined in the claims are desired to be protected. It should be understood that while the use of words such as "preferable", "preferably", "preferred" or "more preferred" in the present disclosure suggest that a feature so described may be desirable, it may nevertheless not be necessary and embodiments lacking such a feature may be contemplated as within the scope of the invention as defined in the appended claims. In relation to the claims, it is intended that when words such as "a," "an," or "at least one," are used to preface a feature there is no intention to limit the claim to only one such feature unless specifically stated to the contrary.

The invention claimed is:

1. A compound selected from the following:

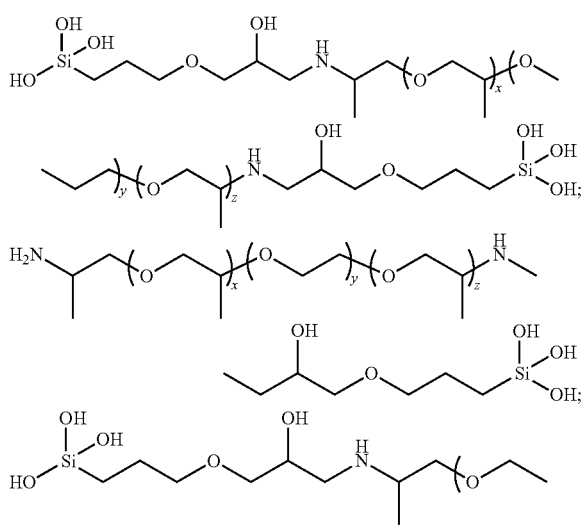

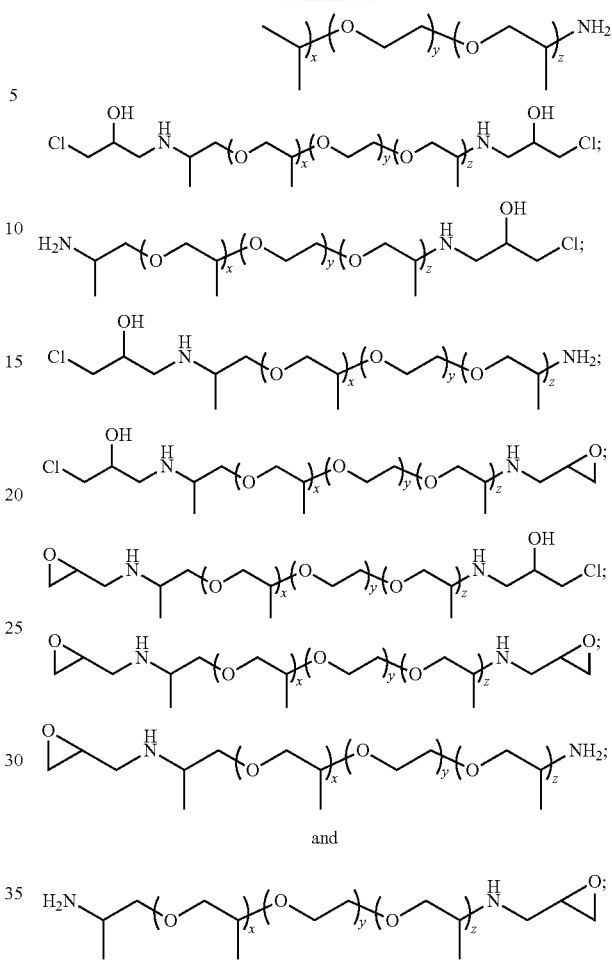

wherein x, y and z are each integers, and wherein x+z is from 5 to 10 and y is from 35 to 45.

* * * * *